United States Patent
Selfridge et al.

(10) Patent No.: US 10,346,003 B2
(45) Date of Patent: Jul. 9, 2019

(54) INTEGRATED GEOLOCATION RESOURCE TRANSFER PLATFORM

(71) Applicant: Bank of America Corporation, Charlotte, NC (US)

(72) Inventors: Stephen Philip Selfridge, Huntersville, NC (US); Tony England, Tega Cay, SC (US); Farhan Ahmed Siddiqi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 180 days.

(21) Appl. No.: 15/294,088

(22) Filed: Oct. 14, 2016

(65) Prior Publication Data
US 2017/0235454 A1    Aug. 17, 2017

Related U.S. Application Data

(60) Provisional application No. 62/296,047, filed on Feb. 16, 2016.

(51) Int. Cl.
| | |
|---|---|
| G06F 21/31 | (2013.01) |
| H04W 4/021 | (2018.01) |
| G06F 3/0484 | (2013.01) |
| G06Q 30/00 | (2012.01) |

(52) U.S. Cl.
CPC ............ G06F 3/0484 (2013.01); G06F 21/31 (2013.01); H04W 4/021 (2013.01)

(58) Field of Classification Search
None
See application file for complete search history.

(56) References Cited

U.S. PATENT DOCUMENTS

| | | |
|---|---|---|
| 5,551,030 A | 8/1996 | Linden et al. |
| 6,054,950 A | 4/2000 | Fontana |
| 6,577,275 B2 | 6/2003 | Turner |
| 8,352,980 B2 | 1/2013 | Howcroft |
| 8,434,021 B2 | 4/2013 | Mullender et al. |
| 8,566,203 B1 | 10/2013 | Vieira et al. |
| 8,768,834 B2 | 7/2014 | Zacarias et al. |
| 8,938,726 B2 | 1/2015 | Barak |
| 8,977,296 B1 * | 3/2015 | Briggs .................. H04W 4/021 455/456.3 |
| 9,070,167 B2 | 6/2015 | Bennett et al. |
| 9,311,168 B1 | 4/2016 | Lewis et al. |
| 9,538,332 B1 * | 1/2017 | Mendelson ............ H04W 4/90 |
| 9,684,909 B2 | 6/2017 | Baker et al. |

(Continued)

*Primary Examiner* — Matthew T Sittner
(74) *Attorney, Agent, or Firm* — Michael A. Springs; Moore & Van Allen PLLC; Peter B. Stewart

(57) ABSTRACT

Embodiments of the invention are directed to systems, methods, and computer program products for providing a centralized, integrated geolocation resource transfer system that is configured to facilitate operative communication between resource entity systems and external devices located within the geographic fence. In this regard, the invention is configured to dynamically identify a plurality of users located within the geographic fence, in real-time. In addition, the invention is configured to facilitate a resource entity system to customize a user interface of a user device based on the user's location. Furthermore, the system is configured to optimize flux parameters and resource distribution in a geographic fence.

20 Claims, 8 Drawing Sheets

(56) References Cited

U.S. PATENT DOCUMENTS

| | | |
|---|---|---|
| 9,791,998 B2 | 10/2017 | Lymer et al. |
| 2002/0077080 A1 | 6/2002 | Greene |
| 2002/0161646 A1 | 10/2002 | Gailey et al. |
| 2002/0161647 A1 | 10/2002 | Gailey et al. |
| 2003/0182191 A1 | 9/2003 | Oliver et al. |
| 2004/0203860 A1 | 10/2004 | Fellenstein et al. |
| 2004/0260604 A1 | 12/2004 | Bedingfield, Sr. |
| 2007/0162337 A1 | 7/2007 | Hawkins et al. |
| 2008/0218405 A1* | 9/2008 | Eckhart ............ G01C 21/20 342/146 |
| 2008/0255942 A1 | 10/2008 | Craft |
| 2008/0319847 A1 | 12/2008 | Shepard |
| 2009/0037275 A1 | 2/2009 | Pollio |
| 2009/0125396 A1 | 5/2009 | Otto et al. |
| 2010/0077017 A1 | 3/2010 | Martinez et al. |
| 2010/0145784 A1 | 6/2010 | Sriver et al. |
| 2010/0225443 A1 | 9/2010 | Bayram et al. |
| 2010/0318407 A1 | 12/2010 | Leff et al. |
| 2011/0071895 A1 | 3/2011 | Masri |
| 2011/0119133 A1 | 5/2011 | Igelman et al. |
| 2011/0238476 A1 | 9/2011 | Carr et al. |
| 2012/0022930 A1 | 1/2012 | Brouhard |
| 2012/0271848 A1* | 10/2012 | Kadowaki ........... G09B 29/007 707/769 |
| 2012/0275383 A1* | 11/2012 | Matsukawa ........... H04W 72/10 370/328 |
| 2012/0310527 A1* | 12/2012 | Yariv ............... G01C 21/3679 701/426 |
| 2012/0316963 A1 | 12/2012 | Moshfeghi |
| 2013/0031047 A1* | 1/2013 | Boazi .................. G01S 19/34 707/609 |
| 2013/0073388 A1 | 3/2013 | Heath |
| 2013/0115972 A1 | 5/2013 | Ziskind et al. |
| 2013/0145049 A1 | 6/2013 | Stanton et al. |
| 2013/0173027 A1* | 7/2013 | Imes ................. F24F 11/63 700/67 |
| 2013/0173344 A1 | 7/2013 | Kundagrami et al. |
| 2013/0346209 A1 | 12/2013 | Longhenry et al. |
| 2014/0129438 A1 | 5/2014 | Desai et al. |
| 2014/0149998 A1 | 5/2014 | Kumar et al. |
| 2015/0163630 A1* | 6/2015 | Hughes, Jr. ........... H04W 4/021 455/456.3 |
| 2015/0242091 A1 | 8/2015 | Lu et al. |
| 2015/0281401 A1* | 10/2015 | Le .................. H04L 67/42 709/203 |
| 2015/0341747 A1* | 11/2015 | Barrand ........... G06Q 30/0201 455/405 |
| 2016/0005077 A1* | 1/2016 | McDevitt ......... G06Q 30/0208 705/14.58 |
| 2016/0196006 A1 | 7/2016 | Doan et al. |
| 2016/0239903 A1* | 8/2016 | Othmer ............... H04W 4/029 |
| 2017/0011580 A1* | 1/2017 | Huang ................ G06Q 10/30 |
| 2017/0026786 A1* | 1/2017 | Barron ............... H04W 4/021 |
| 2017/0061010 A1 | 3/2017 | Lee et al. |
| 2017/0078840 A1* | 3/2017 | Saurav ............... H04W 4/021 |
| 2017/0109724 A1 | 4/2017 | Douglas et al. |
| 2017/0235452 A1* | 8/2017 | Selfridge ............ G06F 3/0484 715/744 |
| 2017/0235453 A1* | 8/2017 | Selfridge ............ G06F 3/0484 715/741 |

\* cited by examiner

INTEGRATED GEOLOCATION RESOURCE TRANSFER PLATFORM

CROSS-REFERENCE TO PRIORITY APPLICATION

This application claims the benefit of U.S. Provisional Patent Application Ser. No. 62/296,047 entitled "Network-Connected Resource Transfer Platform" (filed Feb. 16, 2016), which is hereby incorporated by reference in its entirety.

BACKGROUND

Existing systems for communication between an entity system associated with a resource entity facility and an external device require a transmission of device communication identifiers of the external device to the entity system. As such, it is difficult for an entity system to establish communication channels with an unidentified user device.

SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address these and/or other needs by providing an innovative system, method and computer program product for integrated geolocation resource transfer. In one aspect, the system is configured to provide a resource entity customizable user interface on a user device. Typically the system comprises: at least one memory device with computer-readable program code stored thereon; at least one communication device; and at least one processing device operatively coupled to the at least one memory device and the at least one communication device. Executing the computer-readable code is configured to cause the at least one processing device to: configure a geographic fence, wherein the geographic fence is associated with an physical event geographic area, wherein the geographic fence is configured such that a first resource entity is located in the geographic fence; identify, in real time, a plurality of users currently located within the geographic fence; determine, in real time, a first user of the plurality of users currently located within the geographic fence based on at least determining that the first user is associated with a predetermined situational parameter or a predetermined temporal parameter by: determining that a residential address associated with the first user is not located within the geographic fence; determining for a predetermined historical time period, that the first user has spent an amount of time less than a predetermined amount of time in the geographic fence; or determining that a work address associated with the first user is not located within the geographic fence; establish, via a network, an operative communication channel with a user device associated with the first user; transmit, via the operative communication channel, control instructions that are configured to cause the user device to present a first user interface; and facilitate the first resource entity located within the geographic fence to configure, in real time, the first user interface when the user is located within the geographic fence.

In some embodiments, or in combination with any of the previous embodiments, the system further comprises: a plurality of physical electric transmitter devices, wherein each physical electric transmitter device is configured to transmit a wireless proximity signal to a predetermined broadcast area; wherein executing the computer-readable code is configured to further cause the at least one processing device to: identify one or more physical electric transmitter devices of the plurality of electric transmitter devices that are associated with the physical event geographic area; and configure the geographic fence such that, entering the geographic fence would cause the first user to be within a broadcast range of at least one physical electric transmitter device of the one or more physical electric transmitter devices within a predetermined time period after entering.

In some embodiments, or in combination with any of the previous embodiments, for each physical electric transmitter device, the wireless proximity signal comprises a encoded unique location code associated with the physical electric transmitter device, wherein executing the computer-readable code is configured to further cause the at least one processing device to: receive an encoded augmented signal from the user device, wherein the encoded augmented signal is transmitted by the user device is response to the user device receiving the proximity signal of a physical electric transmitter device, wherein the encoded augmented signal comprises the encoded unique location code of the physical electric transmitter device and a user device identifier; decode the augmented signal to determine the unique location code associated physical electric transmitter device; identify a location of physical electric transmitter device based on the unique location code; and determine that the first user is located within the geographic fence based on determining that the location of physical electric transmitter device is within the geographic fence.

In some embodiments, or in combination with any of the previous embodiments, executing the computer-readable code is configured to further cause the at least one processing device to: transmit a non-intrusive location query to the user device, wherein the non-intrusive location query is configured to receive a response, from the user device, affirming or negating the query; and determine that the first user is located within the geographic fence based on receiving an affirmation of the query from the user device.

In some embodiments, or in combination with any of the previous embodiments, determine, in real time, the first user of the plurality of users currently located within the geographic fence based on determining that the first user is associated with a predetermined temporal parameter, wherein determining that the first user is associated with the predetermined temporal parameter further comprises: determining that the first user has spent an amount of time less than the predetermined amount of time in the geographic fence, for the predetermined historical time period; or determining a current time and determining that the first user was not located in the geographic fence during the current time for the predetermined historical time period.

In some embodiments, or in combination with any of the previous embodiments, determining that the first user is associated with the predetermined situational parameter comprises determining that the residential address associated with the first user is not located within the geographic fence.

In some embodiments, or in combination with any of the previous embodiments, determining that the first user is associated with the predetermined situational parameter comprises determining that the work address associated with the first user is not located within the geographic fence.

In some embodiments, or in combination with any of the previous embodiments, facilitating the first resource entity located within the geographic fence to configure, in real time, the first user interface, further comprises: receiving, from a first resource entity system, application program interface parameters, wherein the application program parameters comprise content specific to the first resource entity; transmitting, via the operative communication channel, control instructions configured to cause, in real time, modification of the first user interface based on the application program parameters; and transmitting, via the operative communication channel, control instructions configured to restore, the first user interface to an original interface based on determining that the user is not located within the geographic fence.

In some embodiments, or in combination with any of the previous embodiments, the application program interface parameters comprise technical routines, application protocols, application interface tools, application interface files, application interface data, and/or application audio visual content.

In some embodiments, or in combination with any of the previous embodiments, the application program interface parameters are associated with one or more activity incentives provided by the first resource entity system, wherein the one or more activity incentives comprise temporal incentives and collective incentives, wherein executing the computer-readable code is configured to further cause the at least one processing device to: transmit, via the operative communication channel, control instructions configured to cause, in real time, display of the one or more activity incentives within the first user interface of the user device; wherein temporal incentives are associated with user activities conducted within a predetermined time period; wherein collective incentives are associated with user activities conducted by a first number of users within a predetermined time period.

In another aspect, embodiments of the invention are further configured for integrated geolocation resource transfer. In this regard, the invention provides systems, methods and computer program products that are configured to the system is configured to provide optimal user flux distribution within a geographic fence using a centralized integrated geolocation resource transfer platform. In some embodiments, or in combination with any of the previous embodiments, executing the computer-readable code is configured to cause the at least one processing device to: identify, a first plurality of resource entities located within a geographic fence, wherein the geographic fence is associated with an physical event geographic area containing the first plurality of resource entities; determine, in real time, for each resource entity of the first plurality of resource entities, physical flux parameters associated with the resource entity, wherein the physical flux parameters are associated with current user traffic at the resource entity; identify, in real time, a first user currently located within the geographic fence; establish, via a network, an operative communication channel with a user device associated with the first user; and based on determining, in real time, that (i) at least one resource entity of the first plurality of resource entities is associated with predetermined flux parameters lower than a predetermined value, and (ii) the first user is not currently located within a predetermined distance of the at least one resource entity, transmit, via the operative communication channel, control instructions that are configured to cause the user device to present a first user interface; wherein the first user interface is configured to route the first user to the at least one resource entity.

In some embodiments, or in combination with any of the previous embodiments, the physical flux parameters comprise one or more of user traffic at the resource entity, current user volume of the resource entity, estimated checkout time at the resource entity, user influx and user outflow of the resource entity.

In some embodiments, or in combination with any of the previous embodiments, executing the computer-readable code is configured to further cause the at least one processing device to: determine, for each resource entity of the first plurality of resource entities, a travel time duration for the user to travel to the resource entity from the user's current location; determine, for each resource entity of the first plurality of resource entities, an estimated checkout time duration; determine, for each resource entity of the first plurality of resource entities, an activity time duration comprising a combination of the travel time duration and the checkout time duration for the resource entity; and wherein determining that the at least one resource entity of the first plurality of entities is associated with predetermined flux parameters lower than the predetermined value comprises determining that an activity time duration for the at least one resource entities is below a predetermined value.

In some embodiments, or in combination with any of the previous embodiments, executing the computer-readable code is configured to further cause the at least one processing device to: identify one or more products associated with the first user; and transmit, via the operative communication channel, control instructions that are configured to cause the user device to route the first user to the at least one resource entity based on determining that the at least one resource entity is associated with the one or more products.

In another aspect, embodiments of the invention are further configured to provide a mobile device (user device) for integrated resource transfer. In this regard, the invention provides a system comprising the mobile device, methods and computer program products that are configured to the mobile device is configured to provide a centralized integrated resource transfer application comprising integrated resource entity applications for performing a user activity. In some instances, the mobile device comprises: at least one memory device with computer-readable program code stored thereon; at least one communication device; and at least one processing device operatively coupled to the at least one memory device and the at least one communication device. Typically, executing the computer-readable code is configured to cause the at least one processing device to: initiate an integrated user application, wherein initiating the integrated user application comprises presenting a central user interface on the mobile device; initialize a resource entity specific module of the integrated user application; present, in real time, an interface of a first resource entity application within the presentation of the central user interface, wherein the first resource entity application is stored in a memory device of the mobile device; perform at least one user activity using the interface of the first resource entity application within the central user interface; and facilitate a first resource system associated with the first resource entity application to configure, in real time, the interface of a first resource entity application within the central user interface.

In some embodiments, or in combination with any of the previous embodiments, executing the computer-readable code is configured to further cause the at least one processing device to initialize the resource entity specific module based on determining that the mobile device is located within a resource entity location by: receiving a wireless proximity signal from a physical electric transmitter device, wherein the wireless proximity signal comprises a unique encoded location code associated with the physical electric transmitter device; decoding the augmented signal to determine the unique location code associated physical electric transmitter device; and determining that the mobile device is located within the resource entity location based on determining the unique location code is associated with the resource entity location.

In some embodiments, or in combination with any of the previous embodiments, executing the computer-readable code is configured to further cause the at least one processing device to initialize the resource entity specific module based on receiving, at the user mobile device, instructions from a user.

In some embodiments, or in combination with any of the previous embodiments, executing the computer-readable code is configured to further cause the at least one processing device to: determine one or more activity events associated with the at least one user activity; determine that the first resource entity application is associated at least one activity event of the one or more activity events; and determine that a second entity application is associated at least one activity event of the one or more activity events.

In some embodiments, or in combination with any of the previous embodiments, executing the computer-readable code is configured to further cause the at least one processing device to: determine, for the first resource entity application, a first level of authentication required for performing the associated at least one activity event; determine, for the second resource entity application, a second level of authentication required for performing the associated at least one activity event; request, from the user, authentication credentials associated with the first level of authentication based on determining that the first level of authentication is greater than the second level of authentication; wherein successful validation of the authentication credentials associated with the first level of authentication authenticates the user for the first resource entity application and the second resource entity application.

In some embodiments, or in combination with any of the previous embodiments, executing the computer-readable code is configured to further cause the at least one processing device to: integrate, dynamically, the interface of the first resource entity application and an interface of the second resource entity application with the centralized user interface, in a predetermined sequence.

In some embodiments, or in combination with any of the previous embodiments, executing the computer-readable code is configured to further cause the at least one processing device to: integrate, dynamically, the interface of the first resource entity application and an interface of the second resource entity application with a single interface of the centralized user interface.

In some embodiments, or in combination with any of the previous embodiments, executing the computer-readable code is configured to further cause the at least one processing device to: receive, from the first resource entity system, application program interface parameters, wherein the application program parameters comprise content specific to the first resource entity system; modify the interface of a first resource entity application within the central user interface based on the application program parameters.

In some embodiments, or in combination with any of the previous embodiments, the application program interface parameters are associated with one or more activity incentives provided by the first resource entity system, wherein the one or more activity incentives comprise temporal incentives and collective incentives, wherein executing the computer-readable code is configured to further cause the at least one processing device to: display of the one or more activity incentives within the interface of a first resource entity application within the central user interface; wherein temporal incentives are associated with user activities conducted within a predetermined time period; wherein collective incentives are associated with user activities conducted by a first number of users within a predetermined time period.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
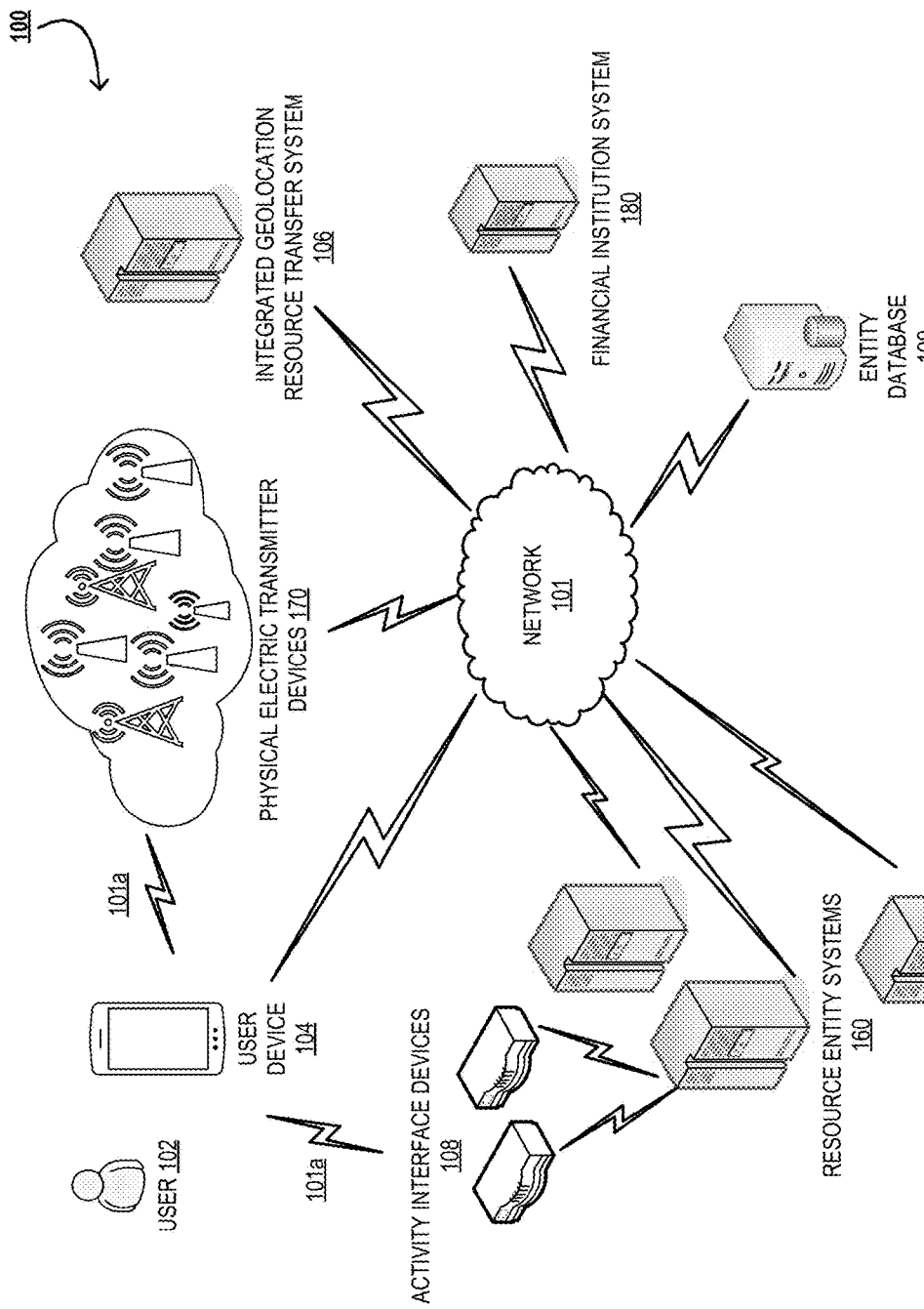
Figure 2:
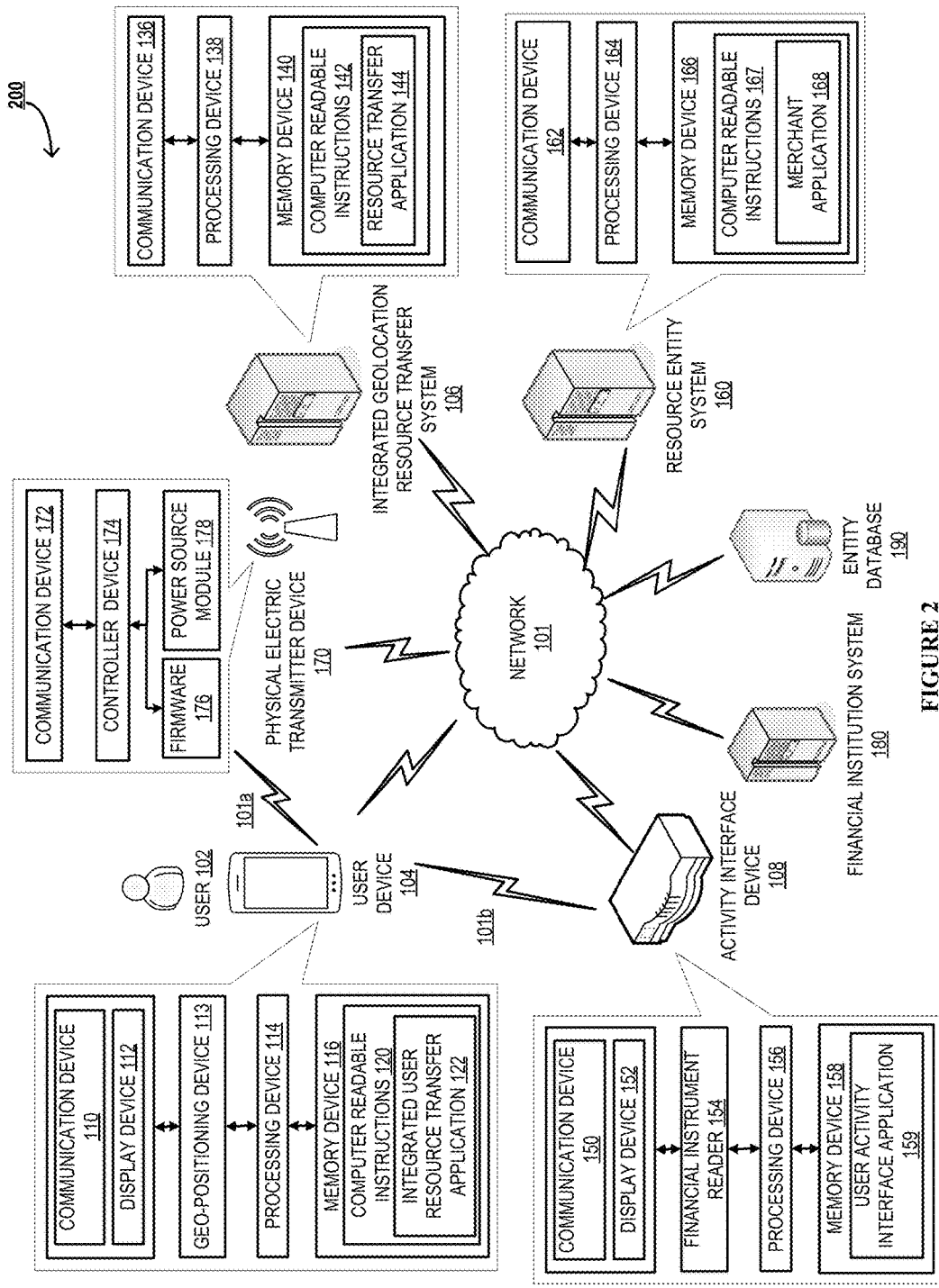
Figure 3:
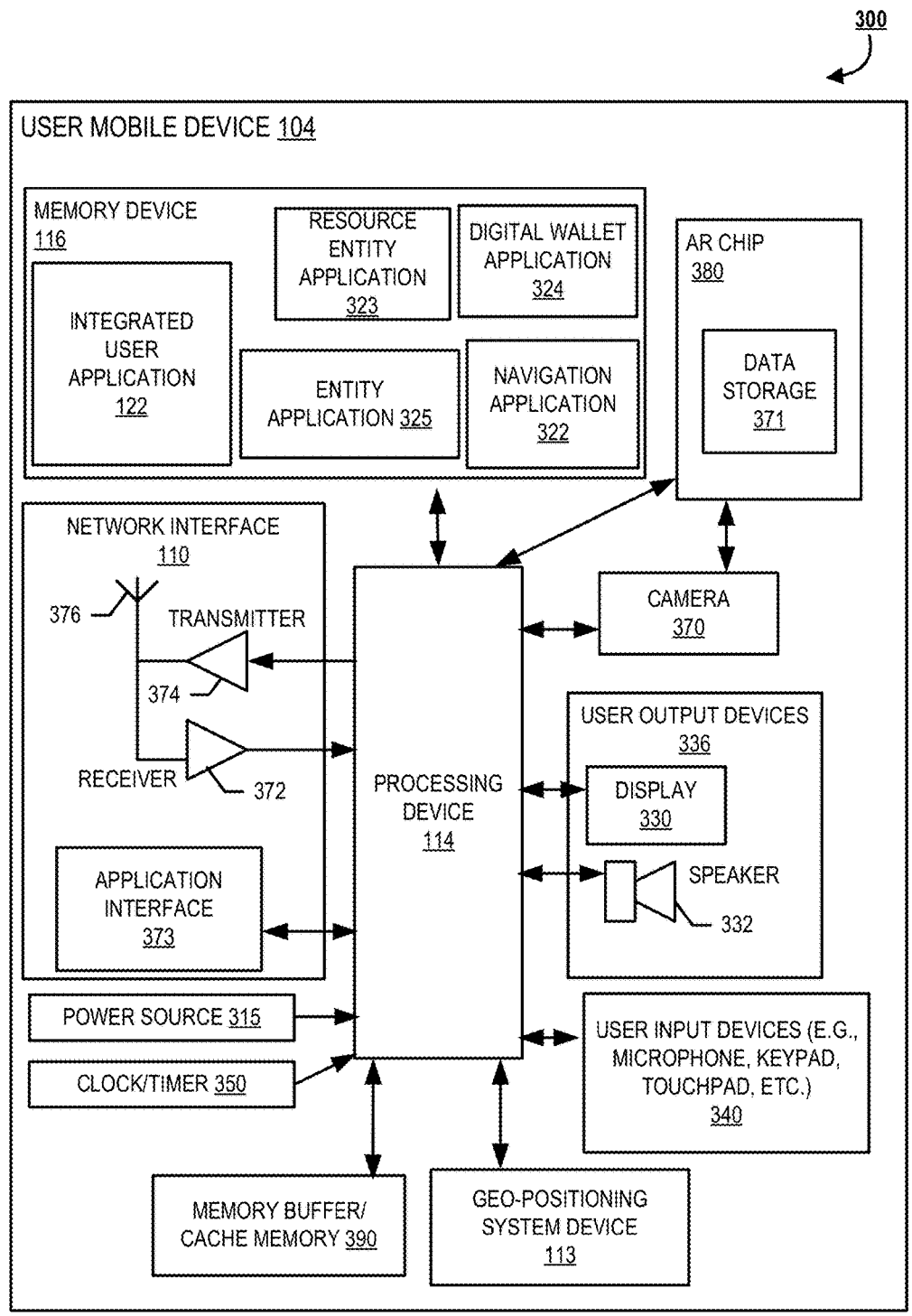
Figure 4:
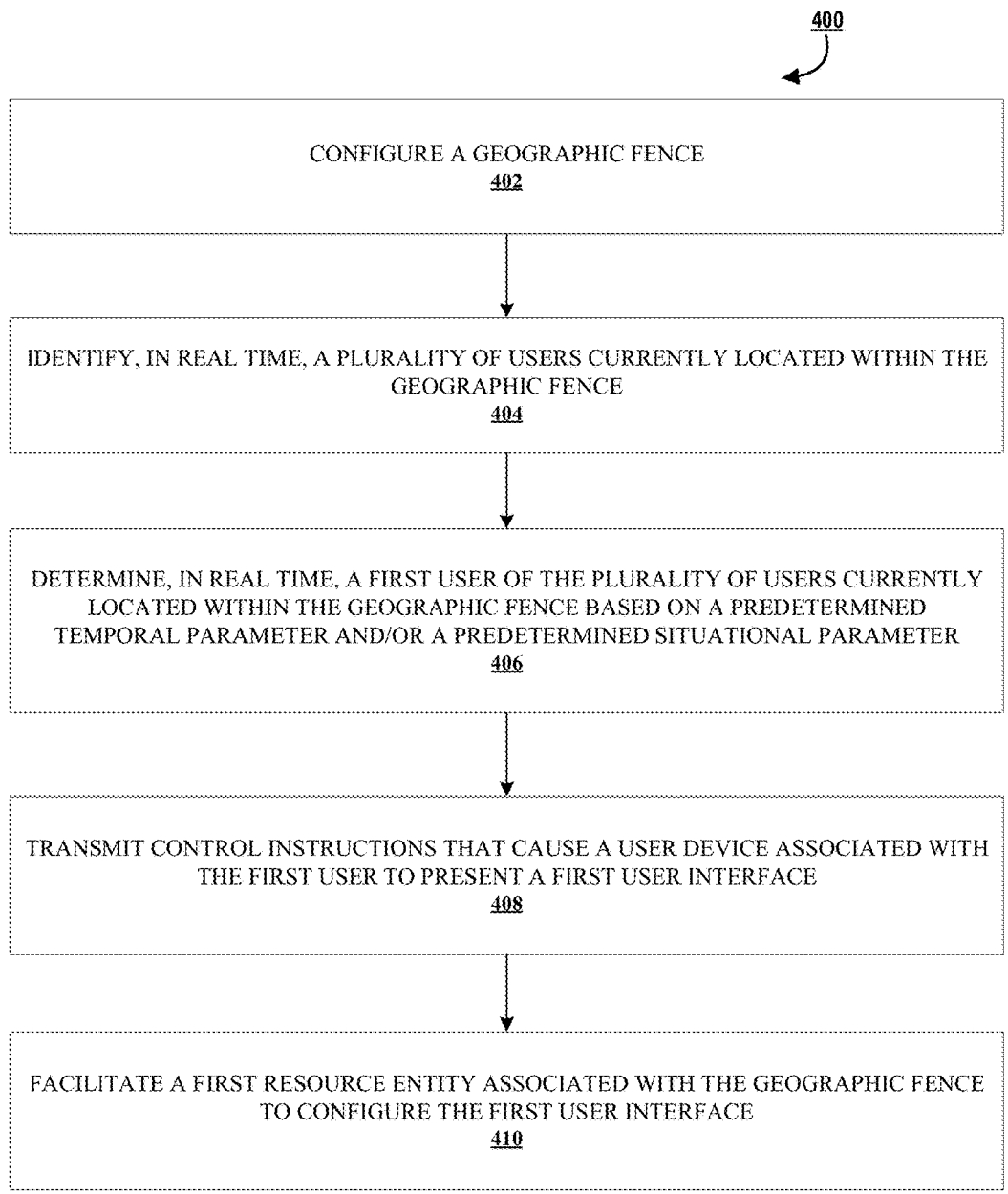
Figure 5:
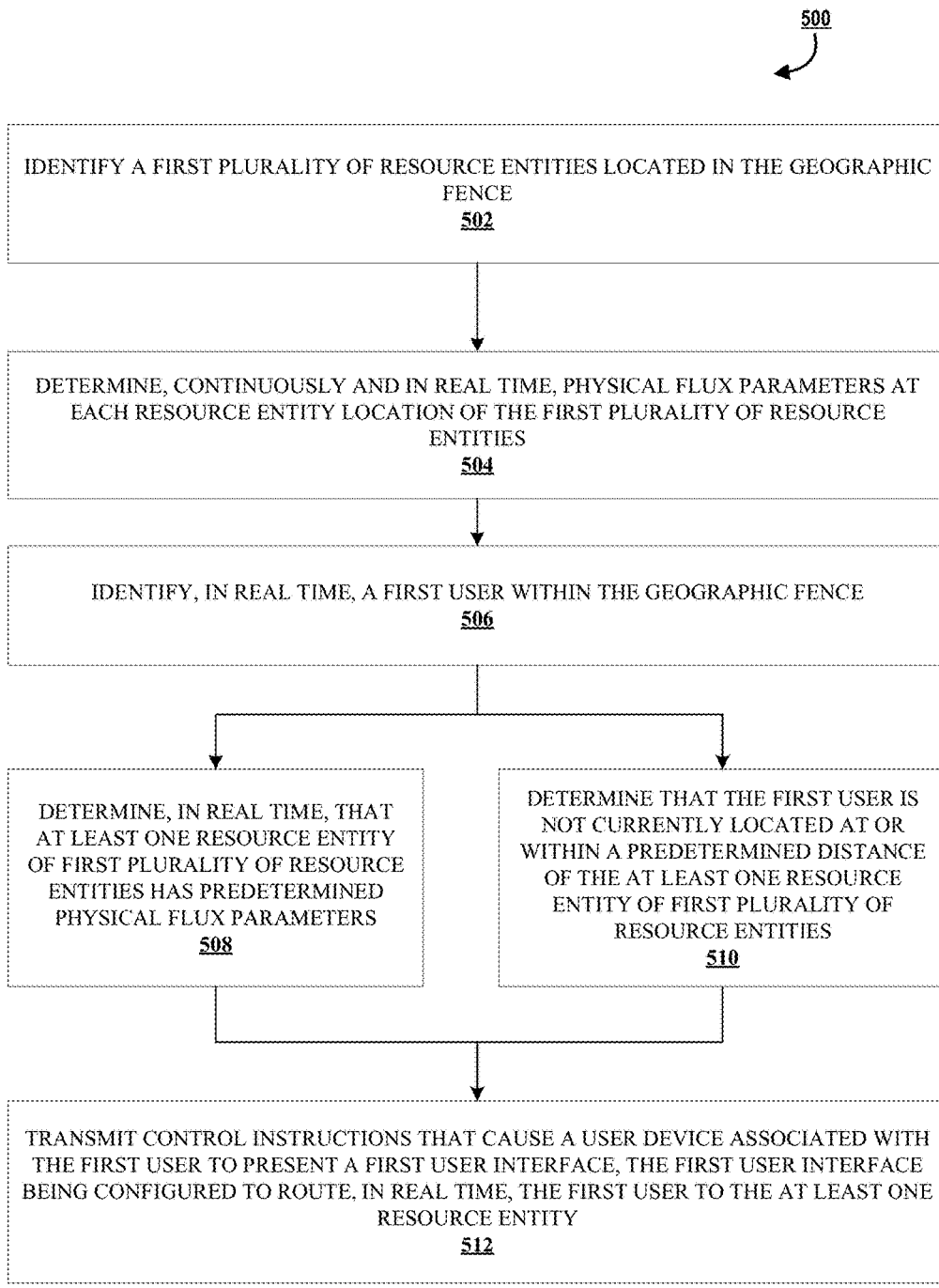
Figure 6:
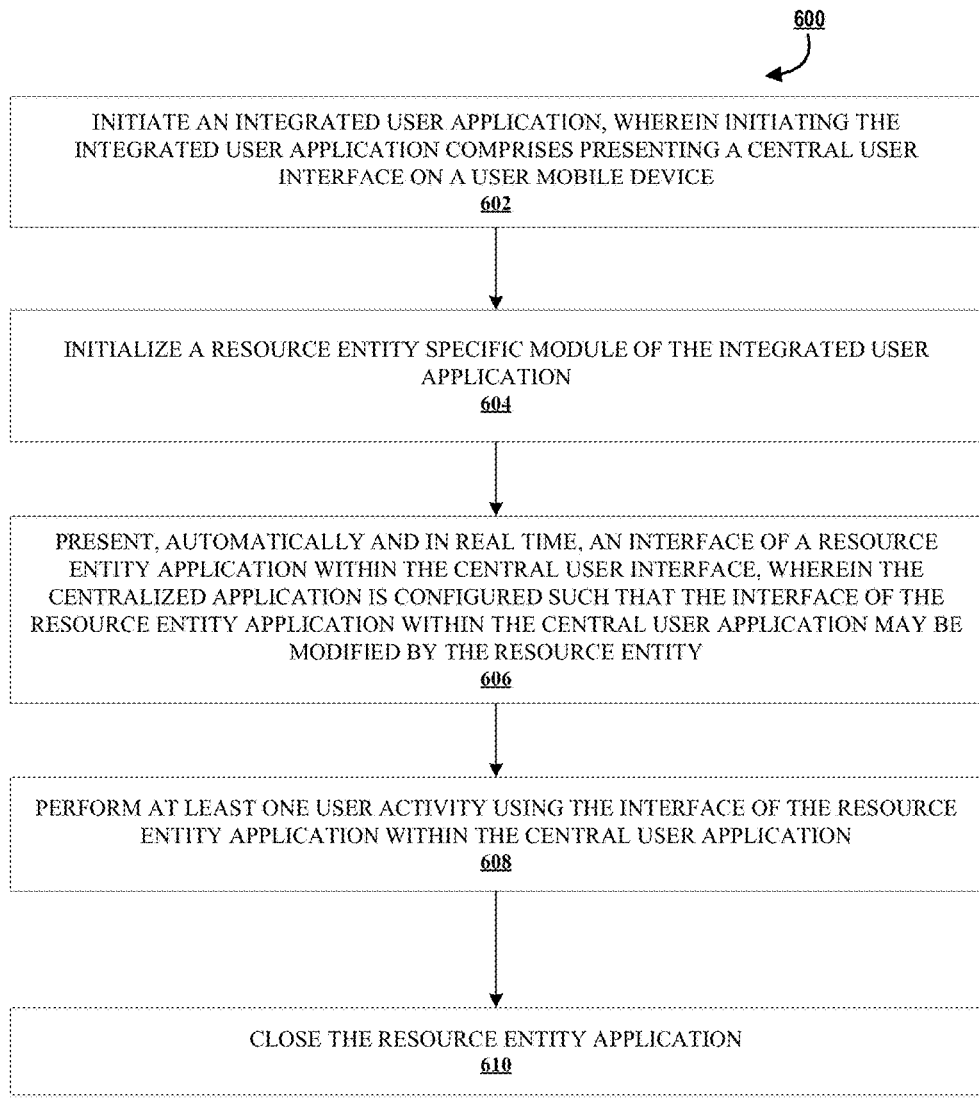
Figure 7:
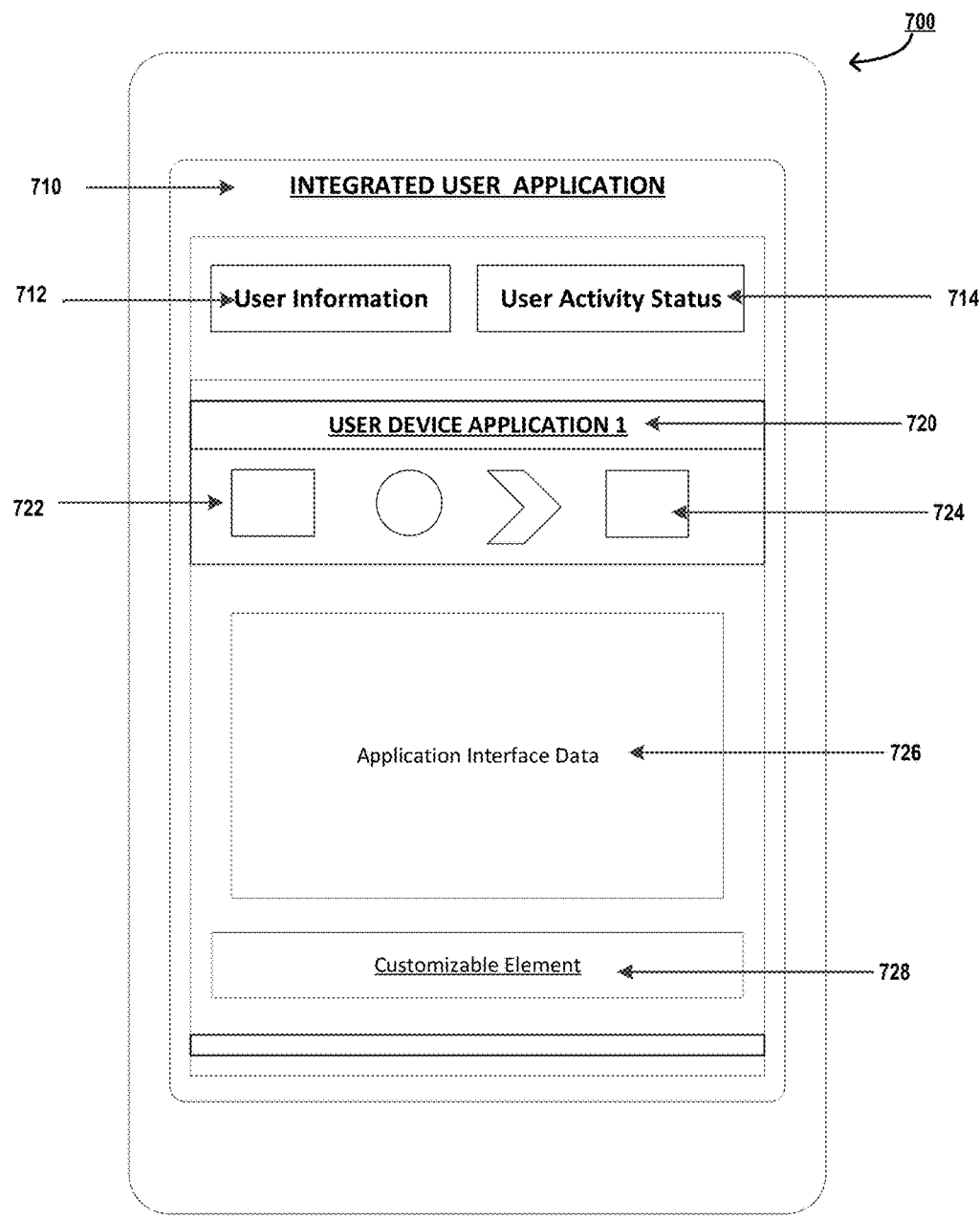
Figure 8:
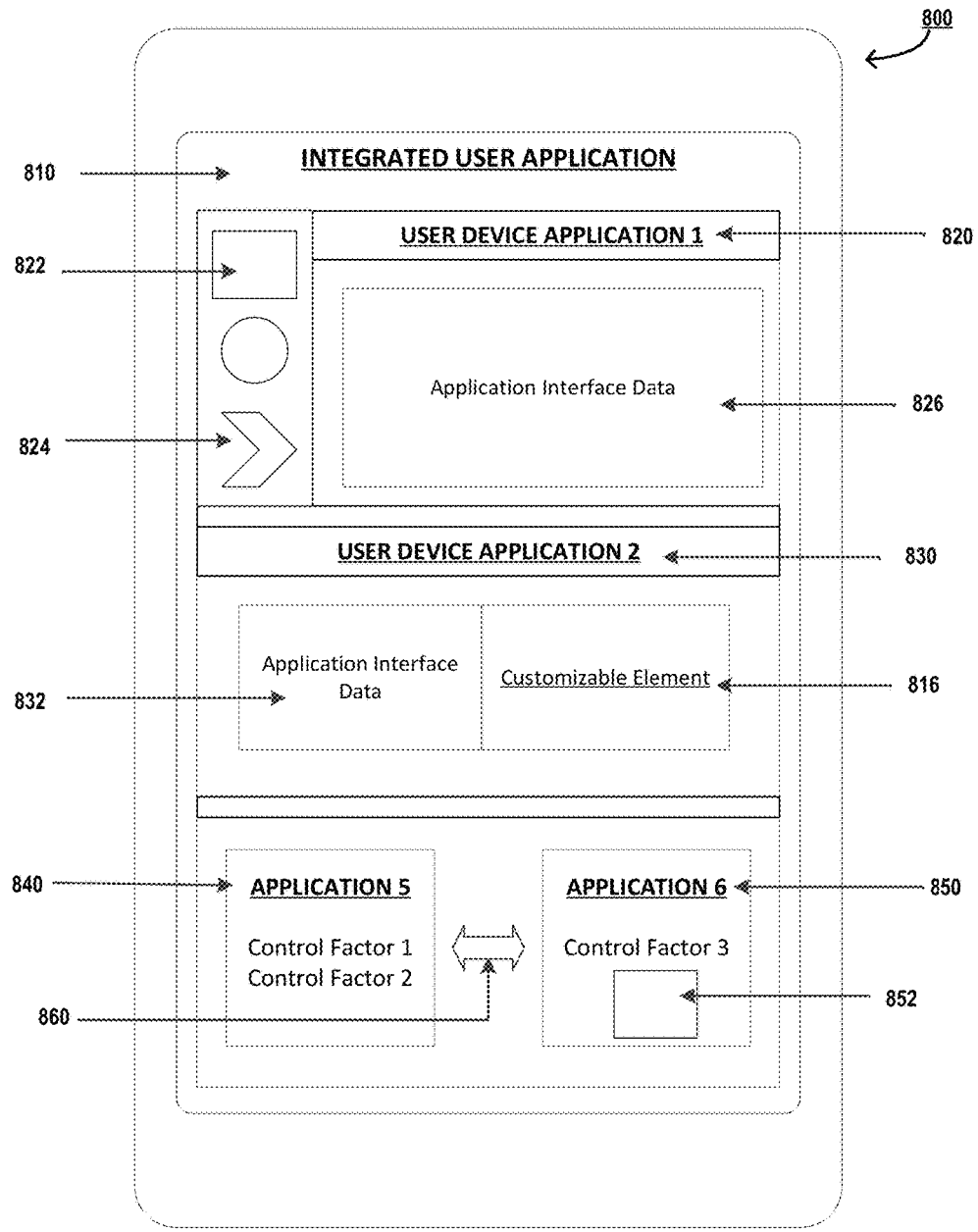

Having thus described embodiments of the invention in general terms, reference will now be made to the accompanying drawings, wherein:

FIG. 1 depicts an integrated geolocation resource transfer platform environment 100, in accordance with one embodiment of the present invention;

FIG. 2 depicts an integrated geolocation resource transfer platform environment 200, in accordance with one embodiment of the present invention;

FIG. 3 depicts the hardware and software components of a user device, in accordance with one embodiment of the present invention;

FIG. 4 depicts a high level process flow 400 for a geolocation based interface configuration process, in accordance with one embodiment of the present invention FIG. 5 depicts a high level process flow 500 for optimal user flux distribution within the geographic fence, in accordance with one embodiment of the present invention;

FIG. 6 depicts a high level process flow 600 for providing a centralized integrated resource transfer application on a user device, in accordance with one embodiment of the present invention;

FIG. 7 depicts a central user interface 700 of an integrated user resource transfer application, in accordance with one embodiment of the present invention; and FIG. 8 depicts a central user interface 800 of an integrated user resource transfer application, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on."

In some embodiments, an "entity" or "enterprise" as used herein may be any institution or establishment, associated with a network connected resource transfer platform, and particularly geolocation systems and devices. As such, the entity may be any institution, group, association, financial institution, merchant, establishment, company, union, authority or the like.

As described herein, a "user" is an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

In the instances where the entity is a resource entity or a merchant, financial institution and the like, a user may be an individual or entity with one or more relationships, affiliations or accounts with the entity (for example, the merchant, the financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, a non-monetary user profile that includes only personal information associated with the user, or the like. The technology resource or account is typically associated with and/or maintained by an entity, and is typically associated with technology infrastructure such that the resource or account may be accessed, modified or acted upon by the user electronically, for example using activity interface devices or transaction terminals, user devices, merchant systems, and the like. In some embodiments, the entity may provide one or more technology instruments or financial instruments to the user for executing resource transfer activities or financial transactions. In some embodiments, the technology instruments/financial instruments like electronic tokens, credit cards, debit cards, checks, loyalty cards, entity user device applications, account identifiers, routing numbers, passcodes and the like are associated with one or more resources or accounts of the user. In some embodiments, an entity may be any institution, group, association, club, establishment, company, union, authority or the like with which a user may have a relationship. As discussed, in some embodiments, the entity represents a vendor or a merchant with whom the user engages in financial (for example, resource transfers like purchases, payments, returns, enrolling in merchant accounts and the like) or non-financial transactions (for resource transfers associated with loyalty programs and the like), either online or in physical stores.

As used herein, a "user interface" may be a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, activity interface devices, processing systems and the like.

An electronic activity, also referred to as a technology activity, such as a "resource transfer" or "transaction", may refer to any activities or communication between a user or entity and the financial institution, between the user and the entity, activities or communication between multiple entities, communication between technology applications and the like. A resource transfer may refer to a payment, processing of funds, purchase of goods or services, a return of goods or services, a payment transaction, a credit transaction, or other interactions involving a user's resource or account. In the context of a financial institution or a resource entity such as a merchant, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution. A resource transfer may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. Unless specifically limited by the context, a "resource transfer" a "transaction", "transaction event" or "point of transaction event" refers to any activity initiated between a user and a resource entity such as a merchant, between the user and the financial instruction, or any combination thereof. In some embodiments, a resource transfer or transaction may refer to financial transactions involving direct or indirect movement of funds through traditional paper transaction processing systems (i.e. paper check processing) or through electronic transaction processing systems. In this regard, resource transfers or transactions may refer to the user initiating a purchase for a product, service, or the like from a merchant. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated it could mean that the transaction has already occurred, is in the process of occurring or being processed, or it has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures, and the like.

In accordance with embodiments of the invention, the term "user" may refer to a customer or the like, who utilizes an external apparatus such as a user device, for executing resource transfers or transactions. The external apparatus may be a user device (computing devices, mobile devices, wearable devices, and the like), a payment instrument (credit cards, debit cards, checks, digital wallets, currency, loyalty points), and/or payment credentials (account numbers, payment instrument identifiers). In some embodiments, the user may perform transactions by swiping payment instruments at a transaction terminal, for example, by swiping a magnetic strip of a credit card along a magnetic reader of a transaction terminal. In some embodiments, the transactions may be performed by wireless communication or "tapping" between the customer device and the activity interface device or transaction terminal. In accordance with some embodiments of the invention, the term "tap" or "tapping" may refer to bringing an external apparatus close to or within a predetermined proximity of the activity interface device or transaction terminal interface so that information (such as encrypted tokens, financial resource/account identifiers, and the like) can be communicated wirelessly between the external apparatus and the activity interface device or transaction terminal using short range wireless transmission technology, such near-field communication (NFC) technology, radio-frequency (RF) technology, audio-frequency communication, or the like. Tapping may include physically tapping the user device against an appropriate portion of the activity interface device or the transaction terminal or it may include only waving or holding the user device near an appropriate portion of the activity interface device or the transaction terminal without making physical contact with the transaction terminal.

In accordance with embodiments of the invention, the term "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application. In accordance with embodiments of the invention, the term "module" with respect to an apparatus may refer to a hardware component of the apparatus, a software component of the apparatus, or a component of the apparatus that comprises both hardware and software. In accordance with embodiments of the invention, the term "chip" may refer to an integrated circuit, a microprocessor, a system-on-a-chip, a microcontroller, or the like that may either be integrated into the external apparatus or may be inserted and removed from the external apparatus by a user.

In some embodiments, an activity interface device refers to one or more devices that facilitate execution of financial transactions. In some instances, the activity interface device comprises a transaction terminal. In this regard the transaction terminals can comprise Automated Teller Machines (ATMs), Point of sale devices (POS), vending machines, checkout registers, ticket vending machines, automated retail transaction devices, banking terminals in a financial institution and other transaction terminals that facilitate transactions in one form or another. In some embodiments, the activity interface device or the transaction terminal refers to devices that facilitate execution of non-financial transactions or activities, for example, check-in terminals for various industries, for example: hospitality, travel, healthcare and the like, information kiosks and other transaction terminals that do not involve financial transactions via the transaction terminal. In some embodiments, the activity interface devices or the transaction terminals facilitate execution of both financial and non-financial transactions/activities. In some embodiments, the activity interface devices or transaction terminals require the user to perform one or more authentication steps based on the level of authorization desired for a particular transaction. For example, the user may be required to slide cards with magnetic strips, provide one or more account numbers, userID and the like and the accompanying personal identification numbers (PIN), passwords, CVV numbers associated with the individual transaction terminal, provide biometric information, perform audio or visual challenges and the like.

In one aspect, the present invention is directed to a system for providing a centralized, integrated geolocation resource transfer system that is configured to facilitate operative communication between users currently located in a geographic fence and resource entities or merchants located within the fence. In this regard, the invention dynamically identifies a plurality of users located within the geographic fence, in real-time. The invention provides an improvement over existing systems because the present invention employs user geolocation data to facilitate communication between disparate systems and devices, which could not communicate otherwise. Specifically, the present invention is configured to establish communication channels between resource entity systems and user devices typically unknown or unrecognizable by the systems, without requiring transmission of personal user device information or user information to the resource entity systems. In addition to establishing communication between disparate systems, the invention facilitates the resource entity system to customize a user interface of a user device based on the user's location. Furthermore, the system is configured to optimize flux parameters and resource distribution in a geographic fence. These features will be described in detail throughout this disclosure.

In another aspect, the present invention is directed to providing a centralized, integrated resource transfer application on a user mobile device. The integrated resource transfer application is typically configured to launch, control, modify and operate applications stored on the mobile device. In this regard, the integrated resource transfer application facilitates the user to perform a user activity, such as a purchase transaction activity, using multiple applications from a centralized user interface, without requiring the user to open and close one application after another. The integrated resource transfer application provides a novel method for channeling required functionality of mobile device applications, without requiring all of the applications to be running in the background, thereby reducing processing power and memory requirements. Another aspect of the integrated resource transfer application is directed to determination of pertinent applications for the user activity and automatic launching the applications within the central interface, by transferring control between applications, automatically, and in a suitable order.

FIG. 1 illustrates an integrated geolocation resource transfer platform environment 100, in accordance with one embodiment of the present invention. As illustrated in FIG. 1, an integrated geolocation resource transfer system 106, configured for providing holistic geolocation mapping, tracking, and associated resource transfers for a plurality of resource entities, is operatively coupled, via a network 101 to physical electric transmitter devices 170, to resource entity systems 160, to activity interface devices 108, to financial institution systems 180, entity databases 190, user devices 104 and other external systems/third-party servers not illustrated herein. In this way, the integrated geolocation resource transfer system 106 can send information to and receive information from multiple resource entity systems 160 and user devices 104 to provide an integrated platform for geolocation based integrated user resource transfer application to a user 102 that is typically infinitely customizable by the system 106, the resource entity system 160 and/or the financial institution system 180.

In some instances, the integrated geolocation resource transfer platform environment 100 comprises one or more (typically, a plurality of) physical electric transmitter devices 170. These physical electric transmitter devices are typically located at distributed geographic locations, for example, across a predetermined expanse of an area in a suitable arrangement. These physical electric transmitter devices 170 are in operative communication with the integrated geolocation resource transfer system 106, via network 101, in some embodiments. The physical electric transmitter devices 170 or proximity marker devices 170 are typically configured for operative communication with and/or identification of compatible external devices, such as user devices 104, which are within a predetermined proximity of the devices 170, as will be described in detail later on.

Typically, one or more resource entities, such as merchants, stores, and other resource providers for products and/or services, may elect to participate in an integrated geolocation resource transfer network/platform and/or resource entity user engagement programs provided and/or managed by the integrated geolocation resource transfer system 106. The integrated geolocation resource transfer system 106 may be associated with, operation and/or owned by any entity or financial institution (such as the financial institution associated with system 180) that facilitates the integrated platform. Each of the one or more resource entities may be associated with a resource entity system 160, in operative communication with the integrated geolocation resource transfer system 106, via the network 101. In some instances, the resource entities provide and/or are in operative communication with the physical electric transmitter devices 170. In some instances, the one or more resource entities provide activity interface devices 108 to facilitate communication with users 102 during initiation, processing and/or completion of user activities such as resource transfers/transactions. In this regard, each resource entity system 160 may be in operative communication with one or more activity interface devices 108 that are configured to communicate with users 102, for example, via user devices 104.

The one or more users may be users of the resource entities/financial institution system operating the integrated geolocation resource transfer system 106, users of the one or more resource entities or other individuals who elect to participate or enroll in integrated geolocation resource transfer programs offered by the integrated geolocation resource transfer system 106 and/or the one or more resource entities. The users may conduct one or more resource transfers/transactions by utilizing user devices 104 to communicate with the resource entity systems 160, either directly or using the activity interface devices 108 via a communication channel 101b. The integrated geolocation resource transfer system 106, the resource entity systems 160, the physical electric transmitter devices 170 and/or the user devices 104 may further communicate with financial institution systems 180 to facilitate the transactions. In this regard, the financial institution system 180 may refer to financial institutions or entities owning or operating the financial accounts/payment instruments or the user 102, may refer to financial service institutions that facilitate payments, may refer to financial institutions associated with the one or more resource entities, and the like. Each of these systems will be described in detail below with respect to FIG. 2.

FIG. 2 illustrates an integrated geolocation resource transfer platform environment 200, in accordance with one embodiment of the present invention. The system environment 200 is substantially similar to the environment 100 described with respect to FIG. 1. The integrated geolocation resource transfer system may comprise an integrated geolocation resource transfer system 106, physical electric transmitter devices 170, one or more resource entity systems 160, entity database 190, activity interface devices 108, financial institution systems 180, and/or user devices 104 in operative communication via the network 101.

The network 101 may be a global area network (GAN), such as the Internet, a wide area network (WAN), a local area network (LAN), or any other type of network or combination of networks. The network 101 may provide for wireline, wireless, or a combination wireline and wireless communication between devices on the network 101. The network 101 is configured to establish an operative connection between otherwise incompatible devices, for example establishing a communication channel, automatically and in real time, between the one or more user devices 104 and one or more of the physical electric transmitter devices 170, when the user device 104 is within a predetermined proximity or broadcast range of the transmitter devices 170, as illustrated by communication channel 101a. The network 101 may also aid establishing an operative connection between otherwise incompatible devices, for example establishing a communication channel between the one or more user devices 104 and the activity interface device 108 as illustrated by communication channel 101b. In this regard, the network 101 (and particularly the communication channels 101a and 101b) may take the form of contactless interfaces, short range wireless transmission technology, such near-field communication (NFC) technology, Bluetooth® low energy (BLE) communication, audio frequency (AF) waves, wireless personal area network, radio-frequency (RF) technology, and/or other suitable communication channels. Tapping may include physically tapping the external apparatus, such as the user device 104, against an appropriate portion of the activity interface device 108 or it may include only waving or holding the external apparatus near an appropriate portion of the activity interface device without making physical contact with the activity interface device.

In some embodiments, the user 102 is an individual that wishes to conduct one or more activities with resource entities, for example using the activity interface devices 108. Typically, the activity interface devices or transactions terminals 108 are owned and operated by the one or more resource entities, the entities associated with the integrated geolocation resource transfer systems or other financial institutions. In some embodiments, the user 102 may access the integrated geolocation resource transfer system 106, the resource entity system 160, and/or the financial institution system 180 through a user interface comprising a webpage or a user application. Hereinafter, "user application" is used to refer to an application on the user device 104 of the user 102, a widget, a webpage accessed through a browser, and the like. In some embodiments the user application is an integrated user resource transfer application 122 stored on the user device 104. In some embodiments the user application may refer to a third party application or a user application stored on a cloud used to access the integrated geolocation resource transfer system 106 and/or the activity interface device 108 through the network 101, communicate with or receive and interpret signals from physical electric transmitter devices 170, and the like. In some embodiments, the user application is stored on the memory device 140 of the integrated geolocation resource transfer system 106, and the user interface is presented on a display device of the user device 104, while in other embodiments, the user application is stored on the user device 104. The user 102 may subsequently navigate through the interface, perform one or more searches or initiate one or more activities or resource transfers using the user device 104. In some embodiments, the user 102 may be routed to a particular destination using the user device 104. In some embodiments, a purchase may be made by the user 102 using the user device 104. In some embodiments, after the user 102 is determined to be within a particular geographic fence or after one or more activities are initiated by the user 102, the integrated geolocation resource transfer system 106 and/or the resource entity system 160 receives user information or user device information or the initiated activity and associated activity information and disseminates the pertinent information to one or more resource entity systems 160, to one or more activity interface devices 108, to one or more physical electric transmitter devices 170, to the entity database 192 and/or the financial institution system 180. In some embodiments the activities, such as purchase transactions, are initiated by the user devices 104 directly in communication with the activity interface device 108 and the information associated with the transaction is transmitted from the user device 104 to the activity interface device 108, typically wirelessly using NFC communication. In some embodiments the activity interface device 108 requests and/or receives additional information from the integrated geolocation resource transfer system 106/the resource entity system 160 and/or the user device 104 for authenticating the user and/or the user device, determining appropriate transaction queues, performing the transactions and other functions.

FIG. 2 also illustrates the user device 104. The user device 104, herein referring to one or more user devices, wherein each device may generally comprise a communication device 110, a display device 112, a geo-positioning device 113, a processing device 114, and a memory device 116. The user device 104 is a computing system that allows a user 102 to interact with other systems to initiate or to complete activities, resource transfers, and transactions for products and/or services redeemable at the activity interface device 108. The processing device 114 is operatively coupled to the communication device 110 and the memory device 116. The processing device 114 uses the communication device 110 to communicate with the network 101*b* and other devices on the network 101, such as, but not limited to the resource entity system 160, the activity interface device 108 and the integrated geolocation resource transfer system 106. As such, the communication device 110 generally comprises a modem, server, or other device for communicating with other devices on the network 101. In some embodiments the network 101 comprises a network of distributed servers. In some embodiments, the processing device 114 may be further coupled to a display device 112, a geo-positioning device 113, and/or a transmitter/receiver device, not indicated in FIG. 2. The display device 112 may comprise a screen, a speaker, a vibrating device or other devices configured to provide information to the user. In some embodiments, the display device 112 provides a presentation of the user interface of the integrated user application 122. The geo-positioning device 113 may comprise global positioning system (GPS) devices, triangulation devices, accelerometers, and other devices configured to determine the current geographic location of the user device 104 with respect to satellites, transmitter/bacon devices, telecommunication towers and the like. In some embodiments the user device 104 may include authentication devices like fingerprint scanners, heart-rate monitors, microphones and the like that are configured to receive bio-metric authentication credentials from the user.

The user device 104 comprises computer-readable instructions 120 stored in the memory device 116, which in one embodiment includes the computer-readable instructions 120 of the user application 122. In this way, users 102 may authenticate themselves, initiate activities, and interact with or receive and decode signals from the physical electric transmitter devices 170, communicate with the integrated geolocation resource transfer system 106 and/or the activity interface devices, authorize a transaction, and/or complete a transaction using the users' user device 104. As discussed previously, the user device 104 may be, for example, a desktop personal computer, a mobile system, such as a cellular phone, smart phone, personal data assistant (PDA), laptop, wearable device or the like.

As further illustrated in FIG. 1, the integrated geolocation resource transfer system 106 generally comprises a communication device 136, at least one processing device 138, and a memory device 140. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 138 is operatively coupled to the communication device 136 and the memory device 140. The processing device 138 uses the communication device 136 to communicate with the network 101 and other devices on the network 101, such as, but not limited to the resource entity systems 160, physical electric transmitter devices 170 and/or the user device 104. As such, the communication device 136 generally comprises a modem, server, wireless transmitters or other devices for communicating with devices on the network 101.

As further illustrated in FIG. 2, the integrated geolocation resource transfer system 106 comprises computer-readable instructions 142 stored in the memory device 140, which in one embodiment includes the computer-readable instructions 140 of a resource transfer application 144. The computer readable instructions 142, when executed by the processing device 138 are configured to cause the system 106/processing device 138 to perform one or more steps described in this disclosure to cause out systems/devices to perform one or more steps described herein. In some embodiments, the memory device 140 includes a data storage for storing data related to user transactions and resource entity information, but not limited to data created and/or used by the resource transfer application 144.

As further illustrated in FIG. 1, the integrated geolocation resource transfer platform 200 comprises a resource entity system 160, generally comprising a communication device 162, a processing device 164, and a memory device 166. As such, the resource entity system 160 may be substantially similar to the system 106 described previously. The processing device 164 is operatively coupled to the communication device 162 and the memory device 166. The processing device 164 uses the communication device 162 to communicate with the network 101 and other devices on the network 101, such as, but not limited to the integrated geolocation resource transfer system 106, activity interface devices 108, physical electric transmitter devices 170 and/or the user device 104. As further illustrated in FIG. 2, the resource entity system 160 comprises computer-readable instructions 167 stored in the memory device 166, which in one embodiment includes the computer-readable instructions 167 of a merchant application 168. The computer readable instructions 167, when executed by the processing device 164 are configured to cause the system 160/processing device 164 to perform one or more steps described in this disclosure, for example, in response to receiving instructions from system 106. In some embodiments, the memory device 166 includes a data storage for storing data related to user transactions and resource entity information, but not limited to data created and/or used by the merchant application 168, although this data may also be stored in and retrieved from an entity database 191, that is central to multiple resource entity systems 160, and a financial institution system 180.

In some embodiments the activity interface device comprises a processing device 138 that is in operative communication with a memory device 140, communication device 136 and a communication interface 137. In some embodiments, the activity interface device 108 comprises a, memory device 140 configured to store instructions 142, searchable and retrievable data, the activity interface device application 144 and the like. The communication interface 137, in some embodiments is an interface used by the user to conduct transactions with the activity interface device 108. The communication interface may include a display (e.g., a liquid crystal display, a touchscreen display, and/or the like) which is operatively coupled to the processing device 138 and the communication device 136. The communication interface 137 may include any number of other devices allowing the activity interface device 108 to transmit/receive data to/from a user, such as a keypad, keyboard, touch-screen, touchpad, microphone, mouse, joystick, other pointer device, button, soft key, and/or other input device(s).

In some embodiments, the communication interface 137 of the activity interface device 108 may include a contactless interface. In one embodiment, the contactless interface is an NFC interface. The contactless interface may be configured to contactlessly and/or wirelessly send and/or receive information over relatively short ranges (e.g., within four inches, within three feet, etc.). The contactless interface may include a transmitter, receiver, smart card, key card, proximity card, Bluetooth® device, radio frequency identification (RFID) tag and/or reader, and/or the like. In some embodiments, the contactless interface communicates information via radio, IR, and/or optical transmissions. Generally, the contactless interface is configured to operate as a contactless transmitter and/or as a contactless receiver. The contactless interface functions to facilitate transactions with users utilizing an external apparatus, for example, the user device 104 capable of contactless communication. Also, it will be understood that the contactless interface may be embedded, built, carried, and/or otherwise supported in and/or on the activity interface device 108. In some embodiments, the contactless interface is not supported in and/or on the activity interface device 108, but the contactless interface is otherwise operatively connected to the activity interface device 108 (e.g., where the contactless interface is a peripheral device plugged into the activity interface device 108, etc.). The contactless interface of the activity interface device 108 is configured to contactlessly and/or wirelessly communicate information to and/or from an external apparatus, for example the user device 104.

The activity interface device 108, may further comprise one or more additional devices to help execute transactions. For example the additional devices may be physical devices like printers to print documents, information, confirmation slips and the like; devices to store and retrieve one or more products dispensed at the activity interface device 108; scanning devices to scan and retrieve data from received documents; ports to receive physical documents; image and video capture devices to help identify and authenticate the user; scanners to receive and process biometric identification credentials like fingerprint identification and voice identification. In some embodiments the activity interface devices are configured to authenticate the user 102 based on establishing an operative communication channel with the user device 104. For instance, the activity interface device may transmit signal with encoded data specific to a user device 104 that other devices cannot recognize and/or decode. The user device 104 (for example, a wearable device or a mobile device) may receive the encoded data and a specific decoding module of the user application 122 may decode the signal and transmit an augmented signal to a receiver on the activity interface device 108. The augmented signal may comprise the decoded signal along with a token identifier of the device 104, one or more user parameters (such as authentication credentials, or indication of a successful validation of credentials received at the decide 104 such as the user's fingerprint or passcode) and the like. In some embodiments, the user device 104 and/or the token are associated with one or more financial institution accounts. The processing device 156, typically in conjunction with the system 106, may then analyze the augmented signal and authenticate the user based on authenticating the user device 104, and allow the user to conduct the activity without seeking additional authentication credentials.

As discussed previously, in some instances, the integrated geolocation resource transfer platform 200 comprises one or more physical electric transmitter devices 170. The physical electric transmitter devices 170 may comprise electric beacon devices, proximity marker devices, hardware transmitters, WiFi transmitters, telecommunication transmitter and/or other physical transmitter devices. The transmitter devices 170 are configured to transmit or broadcast a wireless proximity signal comprising audio signals, ultra-high frequency inaudible signals, electromagnetic waves, Bluetooth® signals, ultrasound signals and the like to a predetermined broadcast area with a predetermined signal strength and frequency. The proximity signals are transmitted continuously, intermittently, or in response to a signal from the system 106, user device 104, or system 160. The wireless proximity signals typically contain encoded data to be transmitted in the vicinity of the activity interface device 108. Typically the encoded data can be decoded only by specific applications (such as the integrated user application 122) or decoders in the user device 104. In some embodiments the transmitter devices 170 are used to determine if the user is within a predetermined proximity of the device 170. For example, the transmitter device 170 may continuously or intermittently (for example, every 10 seconds) transmit an encoded proximity signal. When the user is in the vicinity of the transmitter device 170, the user device 104 may receive the encoded signal from the transmitter 170. In this regard the each transmitter device 170 may have a unique encoded location code that is transmitted in the encoded proximity signal, in some embodiments. The application on the user device 104 may then decode the signal and transmit a response to the transmitter device 170, the integrated geolocation resource transfer system 106, a resource entity system associated with the transmitter device 170, or the like, as an indication of the user's location. In response to identifying that the user's current location is within a particular geographic fence, the system 106 may choose to initiate one or more steps described herein, transmit a message or present an entity customizable interface on the user device 104 (for example: a wearable device or a smart phone), transmit a map directing the user to a suitable resource entity and/or initiate any other suitable actions. In some embodiments, the transmitters are employed to authenticate and/or identify the user 102 or the user device 104. For instance the activity interface device may transmit signal with encoded data that is configured to cause the user device 104 to transmit a signal receipt confirmation along with predetermined user device credentials, or a predetermined portion of user device identifiers or credentials to the transmitter device 170, the integrated geolocation resource transfer system 106, a resource entity system associated with the transmitter device 170, or the like. The user device 104 may receive the encoded data and a specific decoding module in the user device or user application 122 may decode the signal. In response, and in real time, the user application 122 may be further configured to cause the user device 104 to transmit an augmented signal to a receiver of the transmitter device 170, the integrated geolocation resource transfer system 106, a resource entity system associated with the transmitter device 170, or the like. The augmented signal is typically encoded before transmission and may comprise the decoded signal along with a token identifier of the device, one or more user parameters and the like, that help identify and/or authenticate the user. The processing device 156 may then analyze the augmented signal and identify the user. The augmented signal is typically encoded such that only authorized systems such as the transmitter device 170, the integrated geolocation resource transfer system 106, a resource entity system associated with the transmitter device 170, or the like, having a predetermined decoding key can decode the augmented signal.

As such, each physical electric transmitter device 170 typically comprises a communication device 172 for transmitting the proximity signal, a controller device 174 in communication with the communication device for encoding transmitted signals and decoding any received signals, firmware 176 comprising location codes of the device, encoding and decoding keys, and the like, and a power source module 178 for supplying power to the device 170 using external power outlet or internal batteries. The communication device 172 may comprise a communication chip such as a Bluetooth® LE radio chip. The controller device 174 may be a microprocessor or a microcontroller. The firmware 176 is typically configured to monitor, modify or control the transmission power (Tx power, for example a Tx power of −12 dBmW), transmission intervals/frequencies (every 100 milliseconds, 800 milliseconds and the like), and other characteristics of the proximity signal. The transmission power is typically proportional to the broadcast area and signal strength of the proximity signal, and may be modified, in real time, based on control signals received from the system 106 or the system 160.

In the embodiment illustrated in FIGS. 1 and 2, and described throughout much of this specification, the resource transfer application 144 may receive an indication that the user 102 is within a predetermined geographic fence, an indication that the user 106 accessed the integrated geolocation resource transfer application 106 through the user device, and/or an indication that the user has initiated a user activity. In some embodiments the system application 158 may receive an indication that a user 102 accessed the user application of another entity through operative communication with the activity interface device 108 via the network 101. In some embodiments, the resource transfer application 144 may access the user data stored in the data storage 140 or device 116, may receive authentication credentials from a user 102 and permit the user 102 to access the system, through the user application by communicating with the user device 104. In some embodiments, the activity interface device application 144 may access the user data stored in the data storage 140 or data storage 116 of the user device 104, may receive authentication credentials from a user 102 and permit the user 102 to access the integrated geolocation resource transfer system 106 through the activity interface device application 144. The resource transfer application 144 is further configured to monitor the user's navigation through the user application to determine one or more sections or pages of the applications and the user application 122 in particular, accessed by the user 102. In this regard, the resource transfer application 144, in conjunction with the database or data storage 140 may identify multiple dates and times in which the user 102 accessed a particular section or page of the application 122. This data may be used to determine user intent, user's calendars/appointments, user's interests, to build a user profile and transaction history so that the integrated geolocation resource transfer system 106 may assist the user most effectively. For example, the integrated geolocation resource transfer system 106 may determine an appropriate activity interface to be presented to the user based on current (based on user device interaction with transmitter devices 170, or based on accessing a GPS device of the user device 104) or potential future locations of the user. In some embodiments the resource transfer application 144 determines and contracts a user profile, preferably stored in the memory device 140 to maintain data security, comprising the user's demographic information (residential address, work address, loyalty points memberships and the like), authentication information (for example authentication credentials associated with the user and/or the user device), financial information, transaction history and the like.

A typical resource transfer or purchase transaction executed by a user may require the user to present a payment vehicle (e.g., credit card, debit card, or the like) to the resource entity to complete a transaction. During the process of executing the transaction, the resource entity may require the user to provide additional authentication credentials to confirm the identity of the user. This may be in the form of a valid identification document, a signature, a personal identification number (PIN), or the like.

The integrated geolocation resource transfer system 106, the resource entity systems 160, the user device 104, the activity interface devices 108, the financial institution system 108, and/or other devices or systems described herein may be configured to perform any of the steps, processes, or functions described herein. The "system" as referred to herein typically refers to the integrated geolocation resource transfer system 106, operated by the entity, such as a financial institution, but the functions and processes performed by the "system" may be performed by any device or system described herein.

FIG. 3 illustrates an embodiment of the user device 104, such as a user mobile device 104 in further detail, which may be typically configured for integrated geolocation network communication and centralized resource transfer. A "mobile device" 104 may be any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like.

As discussed previously, the mobile device 104 may generally include a processing device 114 communicably coupled to such devices as a memory device 116, user display device 112 comprising user output devices 336, user input devices 340, a communication device or network interface 110, a power source 315, a clock or other timer 350, a visual capture device such as a camera 370, a positioning system device 113, such as a geo-positioning system device like a GPS device, an accelerometer, and the like, one or more Chips 380, and the like.

In some embodiments, the mobile device 104 and/or the server access one or more databases or data stores (such as entity database 190). In some embodiments, the mobile device 104 and/or the server access one or more datastores local to the mobile device 104 and/or server and in other embodiments, the mobile device 104 and/or server access datastores remote to the mobile device and/or server.

The processing device 114 may include functionality to operate one or more software programs or applications, which may be stored in the memory device 116. For example, the processing device 114 may be capable of operating a connectivity program, such as the integrated user application 122, or a web browser application. The centralized integrated user application 122 may then allow the mobile device 104 to transmit and receive web content, such as, for example, location-based content and/or other web page content, according to a Wireless Application Protocol (WAP), Hypertext Transfer Protocol (HTTP), and/or the like.

The processing device 114 may also be capable of operating applications, such as resource entity applications 325 which may refer to one or more merchant applications associated with one or more online and/or brick and mortar merchants, an entity application 325 such as a mobile banking application associated with a financial institution, a digital wallet application 324 associated with one or more payments instruments of the user, a navigation application 322 that is configured to present maps and other geographical information and route the user to one or more destinations, an incentive organization application (not shown).

The chip 380 may include the necessary circuitry to provide token storage and transmission functionality, transmitter device signal encoding and decoding functionality and object recognition and AR functionality to the mobile device 104. Generally, the chip 380 includes data storage 371. The chip 380 and/or data storage 371 may be an integrated circuit, a microprocessor, a system-on-a-chip, a microcontroller, or the like. Of note, while FIG. 3 illustrates the chip 380 as a separate and distinct element within the mobile device 104, it will be apparent to those skilled in the art that the chip 380 functionality may be incorporated within other elements in the mobile device 104. For instance, the functionality of the chip 380 may be incorporated within the memory device 116 and/or the processing device 114. Still further, the chip 380 functionality may be included in a removable storage device such as an SD card or the like.

The processing device 114 may be configured to use the network interface 110 to communicate with one or more other devices on a network 101 such as, but not limited to the integrated geolocation resource transfer system 106, resource entity systems 160, activity interface devices 108, other network devices and systems, and physical electric transmitter devices 170 in particular. In this regard, the network interface 110 may include an antenna 376 operatively coupled to a transmitter 374 and a receiver 372 (together a "transceiver"). The processing device 114 may be configured to provide signals to and receive signals from the transmitter 374 and receiver 372, respectively. The signals may include signaling information in accordance with the air interface standard of the applicable BLE standard, cellular system of the wireless telephone network and the like, that may be part of the network 101. In this regard, the mobile device 104 may be configured to operate with one or more air interface standards, communication protocols, modulation types, and access types. By way of illustration, the mobile device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile device 104 may also be configured to operate in accordance with non-cellular communication mechanisms, such as via a wireless local area network (WLAN) or other communication/data networks. The mobile device 104 may also be configured to operate in accordance Bluetooth® low energy, audio frequency, ultrasound frequency, or other communication/data networks.

The network interface 110 or communication device 110 may also include an application interface 373 in order to allow a user 102 to execute some or all of processes described herein. The application interface 373 may have access to the hardware, for example, the transceiver, and software previously described with respect to the network interface 110. Furthermore, the application interface 373 may have the ability to connect to and communicate with an external data storage on a separate system within the network 101. In some embodiments, the external data is stored in the memory device 140 of the system 106.

As described above, the mobile device 104 includes a display device 112 having a user interface that includes user output devices 336 and/or user input devices 340. The user output devices 336 may include a display 330 (e.g., a liquid crystal display (LCD) or the like) and a speaker 332 or other audio device, which are operatively coupled to the processing device 114. The user input devices 340, which may allow the mobile device 104 to receive data from a user 102, may include any of a number of devices allowing the mobile device 104 to receive data from a user 102, such as a keypad, keyboard, touch-screen, touchpad, microphone, mouse, joystick, other pointer device, button, soft key, and/or other input device(s).

The mobile device 104 may further include a power source 315. Generally, the power source 315 is a device that supplies electrical energy to an electrical load. In some embodiment, power source 315 may convert a form of energy such as solar energy, chemical energy, mechanical energy, and the like, to electrical energy. Generally, the power source 315 in a mobile device 104 may be a battery, such as a lithium battery, a nickel-metal hydride battery, or the like, that is used for powering various circuits, for example, the transceiver circuit, and other devices that are used to operate the mobile device 104. Alternatively, the power source 315 may be a power adapter that can connect a power supply from a power outlet to the mobile device 104. In such embodiments, a power adapter may be classified as a power source "in" the mobile device 104.

The mobile device 104 may also include a memory buffer, cache memory or temporary memory device 390 operatively coupled to the processing device 114. Typically, one or more applications 122, 322-325, are loaded into the temporarily memory 390 during use. As used herein, memory may include any computer readable medium configured to store data, code, or other information. The memory device 116 may include volatile memory, such as volatile Random Access Memory (RAM) including a cache area for the temporary storage of data. The memory device 116 may also include non-volatile memory, which can be embedded and/or may be removable. The non-volatile memory may additionally or alternatively include an electrically erasable programmable read-only memory (EEPROM), flash memory or the like.

The memory device 116 may store any of a number of applications or programs which comprise computer-executable instructions/code executed by the processing device 114 to implement the functions of the mobile device 104 described herein. For example, the memory device 116 may include such applications as the integrated user application 122, resource entity applications 325, an entity application 325 such as a mobile banking application, a digital wallet application 324 associated with one or more payments instruments of the user, a navigation application 322, an incentive organization application, and the like.

FIG. 4 illustrates a high level process flow 400 for a geolocation based interface configuration process 400, in accordance with some embodiments of the invention. The integrated geolocation resource transfer system 106 (hereinafter referred to as the "system"), is configured to perform one or more steps described with respect to process flow 400 and/or transmit control instructions to cause the user device 104, activity interface device 108, resource entity systems 160, entity databases 190, financial institution systems 180, and/or physical electric transmitter devices 170 to perform one or more steps described with respect to the process flow 400. As an initial step, the system is configured to construct or configure a geographic fence, or multiple geographic fences, for a real-world geographic area, as indicated step 402. Each geographic fence or geo-fence, typically comprises an event geographic area enclosed by a virtual perimeter. Each virtual perimeter may further comprise a predetermined set of boundaries.

In some embodiments, the system is configured to determine an event geographic area for the geographic fence. In this regard, in some instances, the event geographic area may be assigned based on geographic coordinates, zip codes, street addresses and the like. For example, the system may determine a geographic area comprising a group of contiguous geographic coordinates or a group of zip codes. As another example, the system may determine a geographic area as the area bounded by one or more roads (that may form the virtual perimeter of the area). In some instances, the event geographic area is determined such that one or more resource entities or merchant facilities are located in the event geographic area. For example, the system may retrieve a plurality of resource entities or merchants associated with the system, and identify locations of each of their facilities. The system may then configure the event geographic area such that a predetermined group of resource entities or merchant facilities of the plurality of identified facilities, are located within the geographic area. The predetermined group of resource entities may comprise resource entities offering similar (or a predetermined category of) products or services, resource entities located in a particular locality, and/or other factors.

In some embodiments, the event geographic area and the virtual perimeter may be determined based on identifying physical electric transmitter devices in the vicinity, at a boundary/virtual perimeter or within a predetermined distance within or outside of the event geographic area. The system may identify available transmitter devices associated with the predetermined group of resource entities, the identified plurality of resource entities, or any other entity or institution in the area. In this regard, the system may configure the event geographic area and/or the virtual perimeter of the geographic fence comprising the predetermined group of facility locations such that, a user entering the geographic fence would be within a predetermined proximity of or within a broadcast range of at least one transmitter device, before lapse of a predetermined time period after entry.

The geographic fence is typically variable in real time and may be modified by the system based on predetermined criteria. The criteria may be one or more of temporal, user specific, resource entity specific, and the like. For instance, the criteria may be temporal, such that the system modifies the geographic fence, automatically and in real time, based on the current time. Here, for an example current time of 12 noon on a Tuesday, the system may modify the geographic fence such that the fence comprises one or more resource entities that provide food products or lunch services. As another instance, for a user specific criteria, the system may analyze a user profile to determine the user's loyalty point affiliations and modify the fence such that the geographic fence comprises at least one resource entity that the user is affiliated with.

Next, the system is typically configured to identify, in real time, a plurality of users currently located within the geographic fence, as indicated by step 404. In this regard, in some embodiments, the system is configured to transmit control instructions to a positioning device of the user device, such as a GPS device or an accelerometer, and in response receive the users' geographic locations, and further identify the plurality of users whose geographic coordinates (for example, GPS coordinates received from the user device) are currently located within the geographic fence. In some embodiments, the system is configured to identify the users within a geographic fence based triangulating the user device locations via their communications with a cellular transmitter or by utilizing the user device's IP address. In some embodiments, the system may identify the users located within the geographic fence based on the user device's interactions with one or more transmitter devices, as discussed previously. For instance, the system may receive the unique encoded location code transmitted by the user device(s) in the encoded proximity signal, decode the signal and identify the geographic location of the transmitter having the unique location code, to hence determine that the user is located within the geographic fence.

In some embodiments, the system may identify the users located within the geographic fence based on identifying one or more user activities, such as a purchase transaction at an activity interface device located within the fence, an AR feed from the user device comprising one or more location markers (buildings, street signs and the like) associated with the geographic fence, a navigation activity of a navigation application of the user device with the user's route terminating at or passing through the geographic fence and the like. In some embodiments, the system may identify the users located within the geographic fence non-intrusively. For example, the system may determine from the user's calendar or social media feeds that the user is scheduled to visit a location A within the geographic fence. The system may then formulate and transmit a non-intrusive location query to determine the location of the user device. For example, the system may transmit a query, "Is the user at location A?" The user device may transmit a response to the query in the form of affirming or negating the query such as "Yes" or "affirmative" or "true" (or a binary equivalent, or another similar polar response) if the user is at Location A or "No" or "negative" or "false" (or a binary equivalent, or another similar polar response) if the user is not situated at Location A. Hence, the system may determine that the first user is located within the geographic fence based on receiving an affirmation of the query from the user device. In this way, the system may identify that the user is location within the geographic fence, even without exact coordinates of the user, thereby protecting user location information.

Next at block 406, the system is configured to determine a first user of the plurality of users currently located within the geographic fence. In this regard, the system is configured to retrieve and analyze user information associated with a user profile. This user information is typically retrieved from the user device itself, requested from the user, retrieved from an entity database, a storage device the system 106 itself, social media systems, other affiliations of the user, cumulative data ascertained by the system in a given time period and the like. The user information typically comprises user residential address, user work address, user facility "check in" information from social media feeds, temporal location data associated with the user and the like. The system typically identifies the first user from the plurality of users based on assessing predetermined situational parameters, predetermined temporal parameters or a suitable combination thereof. Situational parameters are associated with geographic locations associated with the user, specifically in the context of user residence and work locations. In this regard, the system may identify the first user based on determining that either the user's residence or the user's work location are not situated within the geographic fence. In this regard, the system may also determine that the first user is not likely affiliated with the geographic fence based on the analysis of the situational parameters. Temporal parameters are associated with user location patterns and history. In this regard, the system may identify the first user based on determining that the user has spent less than a predetermined amount of time within the geographic area, for a particular time period, such as a historical time period. For instance, the system may identify the first user based on determining that the user has spent less than 10 minutes within in the geographic fence on a daily basis, and determine that the user is likely driving/passing through the area. As another example, the system may determine that the first user has spent less than a combined amount of time of 10 hours in the geographic fence, during the historical time period of the past month. As another temporal parameter, the system may identify the first user based on determining that the first user is not typically situated within the geographic fence at the current time, based on analyzing a historical time period. For example, the system may determine that the user was not located within the fence at the current time or current time range (9 am-10 pm) in a predetermined historical time period (last 6 months). Therefore, the system is configured to connect and communicate with newer visitors to the geographical area and help the users familiarize with the area and its resource entities, which are typically not affiliated with the user.

In response to determining the first user, the system is typically configured to transmit control instructions to the user device, automatically and in real time, that cause the user device associated with the first user to present a first user interface or a central user interface. In this regard, although the first user interface or the central user interface is described herein as being associated with the integrated user application 122, it is understood that the system may cause presentation of the first user interface associated with other applications or browsers of the user device. In this regard, in some instances, the system may transmit control instructions that cause the integrated user application stored on the user device to open and present the interface, automatically. In some instances, the integrated user application may be running in the background on the user device, and the control instructions may cause the integrated user application stored on the user device to present the interface on the display of the user device, automatically. In some embodiments, prior to initiating the presentation of the first/central user interface, the system may modify an existing display to allow the user to choose to, or prevent the user application from opening. The modification of the existing displays may comprise locking the screen for a predetermined period of time (such as 10 seconds) or until the user acquiesces the opening of the application by user voice, touch, or gesture commands. In addition, the system may also dim the brightness of the existing display for a predetermined period of time (such as 10 seconds) or until the user acquiesces the opening of the application by user voice, touch, or gesture commands, thereby reducing power requirements and drawing the user's attention. In some embodiments, based on determining that the user device does not comprise an integrated user application, the system may transmit control instructions that cause the user device and/or facilitate the user to download and install the user integrated application. In some embodiments, the first user interface or the central user interface of the integrated user application is similar to the interfaces illustrated and described with respect to FIGS. 7 and 8, later on in this disclosure.

Typically the presented first/central user interface is infinitely configurable and customizable with functionally and content specific to the first user located within the geographic fence. As indicated by Block 410, the system is further configured to facilitate a first resource entity or merchant (or a plurality of resource entities or merchants) located within the geographic fence, to configure the first/central user interface, either before, during or after presentation of the interface on the user device. In some embodiments, the system keeps the modification/configuration of the user interface active only as long as the user is located within the geographic fence and may be terminated or restored to the initially presented original interface (i.e. removing any entity initiated modifications), by the system based on determining that the user is no longer located within the geographic fence. As such, the system may receive configuration parameters or application program interface (API) parameters from the first resource entity or merchant, for example from a merchant customer relationship management (CRM) interface of the merchant application 168 of the resource entity system. The configuration parameters may comprise technical routines, application protocols, application interface tools, application interface files, documents or application interface data, application audio visual content, and other parameters that are typically specific to the first resource entity or merchant, that are then suitably embedded or integrated within the existing central user interface of the user device, in real time, by the system. For example, the system, based on input from the first resource entity, may customize the first/central interface's background or graphical element such that, the interface background or graphical element displays an image of a storefront of the first resource entity's facility in the geographic fence and the entity's identifiers such as logos and names, as long as the user is located within the geographic fence, to help the user identify the facility.

In some embodiments, the system may further facilitate the first resource entity to provide application program interface parameters comprising entity content to be embedded or displayed within the first or central user interface. This entity content may be tailored to the user, the first resource entity or both. In some embodiments, the entity content comprises one or more activity incentives. For example, the system may modify the user interface with a display of a temporal incentive from the first entity, such as a rebate for a purchase, if the purchase transaction/resource transfer activity is completed within or if the user visits the facility within a predetermined period of time. As such, temporal incentives or rebates are associated with user activities conducted within a predetermined time period. The system may embed/integrate collective incentives received from the entity system. Collective incentives typically are associated with user activities conducted by a first number of users within a predetermined time period. As another example, the system may provide a collective incentive, indicating that if a particular product or service is purchased by a certain number of users (5, 10, 50 and the like) within a predetermined time period (2 hours, 5 hours and the like), all of the users would receive a discount. In this regard, the system may determine based on data received from social media feeds, financial institution systems and the like, that 7 out of 10 first users currently located within the geographic fence are saving for or are seeking to purchase a particular product. The system may then transmit this information, without specific details or identifiers of the first users, to one or more first entities located in the fence, and in turn receive the collective incentive from at least one entity system for the particular product.

FIG. 5 illustrates a high level process flow 500 for optimal user flux distribution within the geographic fence using the centralized integrated geolocation resource transfer platform. As illustrated by step 502, the system is configured to identify a first plurality of resource entities, and specifically entity facilities, located within the geographic fence. In this regard, the system may receive the entity information from the entity systems of the entities located within the geographic fence, from entity databases, and/or other systems. The entity information may comprise location addresses or geographic coordinates of the entrances to the entity facilties within the fence, product identifiers, categories or codes associated with products or services available at the entity facility, customer information (such as crowdsourced information regarding customer ratings, ease of finding products, ease of navigating the facility layout and the like), facility layouts (type of transaction terminals/activity interface devices available (self-checkout, few item checkout, associate checkout and the like) number of each type of transaction terminals, width and layout of the rows and aisles, and other facility information), activity information (such as average time for product selection by users, mean time spent by users between entry and exit of the facility per product/item purchased, average wait time and checkout time for each type of transaction terminal and the like), payment methods accepted, and other entity information.

Next, the system is configured to determine, continuously and in real time, current physical flux parameters of each of the facilities, as indicated by step 504. The physical flux parameters typically comprise user traffic at the facility, user volume or number of users currently in the facility, current user volume or number of additional users that may be accommodated, estimated checkout time in the facility (for example, determined based on entity information discussed above, number of active transaction terminals, number of transactions occurring currently, number of users currently waiting at transaction terminals, and the like), user influx and user outflow, and other parameters. In some embodiments, the system may receive at least a portion of the physical flux parameters from the entity systems, from crowdsourced user information provided by the users currently at the facility, interaction of the user devices located in the facility with transmitter devices or activity interface devices of the facility, location/positioning data retrieved from devices of the plurality of users in the geographic fence and/or other sources. In some embodiments, at least a portion of the physical flux parameters are determined or evaluated or assessed by the system. As illustrated by block 506, the system may identify, in real time, a first user located within the geographic fence in a manner similar to that described with respect to blocks 404 and 406.

The system is configured to route or direct the user to at least one resource entity of the plurality of resource entities located within the geographic fence. In this regard, the system may determine, in real time, that the at least one resource entity has predetermined physical flux parameters, as indicated by block 508. Here, the system may identify the at least one resource entity based on determining that the user traffic at the facility is below a predetermined value, the user volume or number of users currently in the facility is below a predetermined number, and the like. In some instances, the system may identify the at least one resource facility based on determining that an estimated checkout time (time period between entry of a user to the facility and exit after completion of a purchase transaction) is below a predetermined value. In some instances, the system is configured to order the plurality of resource entities based on one or more of their flux parameters to determine the at least one facility that the users may be routed to for optimal user flux distribution. Furthermore, as indicated by block 510, the system may determine that the first user is not currently located at the facility of the at least one resource entity of first plurality of resource entities. In some instances, because the users already located within facilities are not considered, the system may perform user flux optimization with reduced processing time requirements and increased processing speed. In some instances, the system may further determine that the first user is not currently located within a predetermined distance (for example, within a parking lot of the facility) of the at least one resource entity of first plurality of resource entities.

In addition, in some embodiments, the system is configured to determine an activity time for each of the plurality of resource entities. In this regard, the system may determine a travel time for the user to travel to each of the plurality of resource entity locations from the user's current location. The system may then determine the activity time duration, for each entity, as a combination of the determined travel time duration and the determined estimated checkout time duration described above. The system may then determine the at least one resource entity based on determining that the associated activity time is below a predetermined time, or determining that the associated activity time is the lowest of all the resource entities within the geographic fence. This may be determined in conjunction with step 508 and/or step 510.

In addition, in some embodiments, the system may determine one or more products or services that the user is likely interested in, for example based on the user profile, based on user shopping lists, based on user financial information, based on user social media feeds, based on user input provided to the integrated user application interface, and the like. The system may further determine the at least one resource entity that the user may be directed to, based on determining that the resource entity provides the products or services or products or services of the same category that the user is interested in. The system may make this determination, in some instances, in addition to the activity time determination, step 508 and/or step 510 described above.

In addition, in some embodiments, the system may identify the at least one resource entity that the user may be directed to, based on one or more offers received from the resource entity systems, such as the collective and temporal activity incentives described above.

In addition, in some embodiments, the system may determine that the first user, currently located within the geographic fence, is currently being routed to a second resource entity located either within the geographic fence or external to the geographic fence, by a navigation application of the user device. The system may modify the current route and direct the user to the at least one resource entity based on determining that the at least one resource entity has predetermined physical flux parameters lower that the second entity, has activity and/or travel time less than the second entity, provides the services/products, or similar products and services, offered by the second entity, and/or determining that the user is not located within the at least one entity facility, in a manner similar to that described above. In this regard, the system may access and modify the existing route being displayed by user device on an interface of the navigation application. In other instances, the system may halt the display of the navigation application, and instead embed/integrate pertinent features of the navigation application into a display of the central user interface of the integrated user application.

Next, the system is configured to transmit control instructions that cause the user device associated with the first user to present the first/central user interface, as indicated by block 512. The first/central user interface is typically configured to route, in real time, the first user to the at least one resource entity. In this regard, the system may integrate navigation applications of the user device into the central user interface to route the user to the at least one entity. This first/central user interface is typically configurable by the at least one entity, in a manner described with respect to blocks 408 and 410. In this regard, the first or central user interface may display, in an integrated manner, both the elements of the navigation application, and the entity customized features, either together at the same time or one after another.

FIG. 6 illustrates a high level process flow 600 for providing a centralized integrated resource transfer application on a user device, in accordance with some embodiments of the invention. Although, the process flow 600 is described with respect to a user mobile device, it is understood that the process flow is applicable to a variety of other user devices. Furthermore, one or more steps described herein may be performed by the user mobile device 104, integrated user application 122, and/or the system 106. The centralized, integrated resource transfer application 122 stored on a user mobile device, is typically configured to launch, control, modify and operate applications stored on the mobile device. In this regard, the integrated resource transfer application facilitates the user to perform a user activity, such as a purchase transaction activity, using multiple applications from a centralized user interface, without requiring the user to open and close one application after another. The integrated resource transfer application provides a novel method for channeling required functionality of mobile device applications, without requiring all of the applications to be running in the background, thereby reducing processing power and memory requirements. Another aspect of the integrated resource transfer application is directed to determination of pertinent applications for the user activity and automatic launching the applications within the central interface, by transferring control between applications, automatically and in a suitable order.

As indicated by block 602, the user mobile device is configured to initiate the integrated user application. Typically initiating the integrated user application comprises presenting a central user interface on the user mobile device. Initiating the presentation of the central user interface may be substantially similar to that described with respect to blocks 408 and 410 previously. Next, the system is configured to initialize a resource entity specific module of the integrated user application, as illustrated by block 604. In this regard, in some embodiments, the system may initialize the resource entity specific module of the integrated user application based on determining that the user seeks to initiate a user activity. In this regard, the system and/or the mobile device may identify that the user seeks to initiate a user activity based on analyzing the user profile, based analyzing on user shopping lists, based on analyzing user financial information, based on analyzing user social media feeds, and/or based on receiving user input provided to the integrated user application interface using user input devices of the user mobile device or receiving input provided by the entity system. In some instances, the mobile device may determine that the user seeks to initiate a user activity based on determining that the user is currently located in a resource entity or merchant facility, and specifically located near a transaction terminal or user activity interface device. In some instances, the mobile device may determine that the user seeks to initiate a user activity based on receiving a wireless signal from a transaction terminal or user activity interface device, via a wireless network. In some instances, the mobile device may determine that the user seeks to initiate a user activity based on receiving a wireless signal from a physical transmitter device associated with a resource entity, via a wireless network.

In some embodiments, the mobile device may initialize the resource entity specific module of the integrated user application based on receiving instructions from the user via user input features of the user device. In some embodiments, the mobile device may initialize the resource entity specific module of the integrated user application based on receiving an indication from a merchant system, via an operative communication channel through a network. In some embodiments, the mobile device may initialize the resource entity specific module of the integrated user application based on receiving a selection of at least one incentive displayed in the central user interface described previously.

In some embodiments, the mobile device, and specifically, the resource entity specific module of the integrated user application is configured to identify one or more discrete activity events associated with the determined user activity. For example, the mobile device may receive a selection of an incentive from a first resource entity. In response, the mobile device may initialize the resource entity specific module of the user application. The user application and specifically the resource entity specific module may determine a first user activity comprising a purchase transaction with the first resource entity. The user application and specifically the resource entity specific module may then determine that the first user activity comprises a first activity event of routing the user to the facility of the first resource entity, a second activity event activity of invoking a shopping list of the user, a third event activity of adding the selected incentive to the first activity via a merchant application, a fourth event activity of redeeming loyalty points of the user, a fifth event activity of initiating payment for the purchase, and the like Next, in some embodiments, the mobile device, and specifically, the resource entity specific module of the integrated user application is configured to identify one or more resource entity applications stored on the mobile device, for completing the activity events. Continuing with the previous example, the resource entity specific module may identify resource entity applications comprising a navigation application for the first activity event, a user list management application for the second activity event, a merchant application associated with the first resource entity for the third activity event, a user loyalty application for the fourth activity event and two digital wallet applications, each associated with a specific financial entity, for the fifth activity event, and the like.

The integrated user application is further configured to authenticate the user for the user activity. In this regard, the user application is configured to provide centralized authentication, without requiring separate credentials for each resource entity application associated with the user activity. In some embodiments, the integrated user application is configured to determine authentication requirements of each of the identified one or more applications associated with completing the user activity. The integrated user application may then identify a highest level of authentication among the applications. Continuing with the previous example, the user application may identify that a mobile wallet application requiring biometric authentication is a higher level of authentication than the user list management application requiring a passcode. In response to determining the highest level of authentication, the user application may request credentials associated with the highest level of authentication from the user. The successful validation of the received credentials associated with the highest level of authentication from the user, by the mobile device, is typically configured to authenticate the user for the other resource entity applications associated with the activity as well, without requiring separate authentication credentials, thereby reducing processing time.

Next, the integrated user application is configured to present, automatically and in real time, an interface of at least one resource entity application within the central user interface of the integrated user application, as indicated by block 606. The dynamic integration of the user application with the entity applications will be described in conjunction with FIGS. 7 and 8. FIG. 7 illustrates the central user interface 700, in accordance with one embodiment of the invention. As such, the integrated user application is configured to present interfaces associated with the one or more resource entity applications of the user device, one at a time, as illustrated by FIG. 7. In this regard, the integrated user application is configured to dynamically integrate, or embed, data 726 and functionality (action buttons or tools such as 722, other interface elements 728), entity identifiers 724 (such as logos, images and the like) of the resource entity application 720 within the centralized user interface 710 of the integrated user application. As illustrated, the integrated user application is configured to present the interface of the entity application 720 along with functionality of the user application (712, 714). Here, the integrated user application is configured to dynamically integrate, or embed, resource entity interfaces, one after another in a sequence, based on a determined progression of the user activity and activity events. In some instances, the integrated user application may load only required portions of the entity applications in a cache memory location, one after another. The user application is further configured to close out or unload each resource entity application from memory after completion of associated activity event. Therefore, because the present invention does not require opening of multiple interfaces, and because the present invention does not require the resource entity applicants to be running in the background throughout the user activity, the present user application provides an improvement to exiting user activity processing, and an increase in processing speeds and a reduction in memory requirements and processing time for the mobile device.

FIG. 8 illustrates the central user interface 800, in accordance with one embodiment of the invention. Here, the integrated user application is configured to present interfaces associated with a plurality of resource entity applications of the user device, in tandem or in a single interface, as illustrated by FIG. 8. In this regard, the integrated user application is configured to dynamically integrate, or embed, data and functionality of multiple resource entity applications within the centralized user interface of the integrated user application, in a single interface. For example, FIG. 8 illustrates entity applications 820, 830, 840 and 850 integrated into the centralized user interface 810. In this regard, the integrated user application is configured to dynamically integrate, or embed, data and functionality that is pertinent to the user activity. For example, action buttons or tools such as 824, 830, 816 and the like, data elements such as 826, entity identifiers 822, 852 (such as logos, images and the like) and the like. Here, the integrated user application is configured to dynamically integrate, or embed, resource entity interfaces, is a suitable arrangement, based on a determined progression of the user activity and activity events. Here, the in some instances, the user application is configured to selectively increase brightness of the portions of display of the interface associated with the current activity event. In the instances where multiple resource entity applications are identified for a particular activity event, such as two digital wallet applications 840, and 850, the integrated user application may allow the user to choose a suitable digital wallet application using an interface tool 860, within the central user interface. Furthermore, the user interface application is further configured to allow the user to choose a suitable control factor for the entity application out to multiple control factors, within the centralized user interface, such as a first payment instrument and a second payment instrument.

As discussed previously, the interfaces of the resource entity applications are customizable and configurable by the associated resource entity systems. In some embodiments, the resource entity systems may configure at least a portion of the displayed interfaces, such as application interface data 726, 832, customizable elements 728, 816 and the like. In some embodiments, the resource entity systems may configure display elements such as color, sounds, tools and functionality and the like. Therefore, the centralized application is configured such that the interface of the resource entity application within the central user interface of the integrated user application may be modified by the integrated user application based on receiving interface parameters from the associated the resource entity. Next, as illustrated by block 608, the integrated user application is configured to perform at least one user activity and/or the associated activity events using the interface of the resource entity application within the central user interface of the integrated user application, typically in response to receiving indications/confirmation from the users. Furthermore, as discussed previously, the integrated user application is configured to close the associated resource entity applications after completion of the user activity and/or one or more activity events.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. Patent Application Ser. No. | Title | Filed On |
| --- | --- | --- | --- |
| 7110US1.014033.2820 | 15/294,002 (now published as U.S. Patent Application Publication No. 2017/0235452) | INTEGRATED GEOLOCATION RESOURCE TRANSFER PLATFORM | Concurrently herewith |
| 7447US1.014033.2903 | 15/294,025 (now published as U.S. Patent Application Publication No. 2017/0235453) | INTEGRATED RESOURCE TRANSFER APPLICATION | Concurrently herewith |

The invention claimed is:

1. A system for integrated geolocation resource transfer, wherein the system is configured to provide optimal user flux distribution within a geographic fence using a centralized integrated geolocation resource transfer platform, the system comprising:
at least one memory device with computer-readable program code stored thereon;
at least one communication device;
at least one processing device operatively coupled to the at least one memory device and the at least one communication device, wherein executing the computer-readable code is configured to cause the at least one processing device to:
identify, a first plurality of resource entities located within a geographic fence, wherein the geographic fence is associated with an physical event geographic area containing the first plurality of resource entities;
determine, in real time, for each resource entity of the first plurality of resource entities, physical flux parameters associated with the resource entity, wherein the physical flux parameters are associated with current user traffic at the resource entity;
identify, in real time, a first user currently located within the geographic fence;
establish, via a network, an operative communication channel with a user device associated with the first user; and
in response to determining, in real time, that (i) at least one resource entity of the first plurality of resource entities is associated with predetermined flux parameters lower than a predetermined value, and (ii) the first user is not currently located within a predetermined distance of the at least one resource entity:
transmit, via the operative communication channel, control instructions that are configured to cause the user device to present a first user interface, wherein the first user interface is configured to route the first user to the at least one resource entity; and
facilitate the at least one resource entity located within the geographic fence to configure, in real time, the first user interface by receiving, from a first resource entity system associated with the at least one resource entity, application program interface parameters, wherein the application program parameters comprise content specific to the at least one resource entity;
transmitting, via the operative communication channel, control instructions configured to cause, in real time, modification of the first user interface based on the application program parameters; and
transmitting, via the operative communication channel, control instructions configured to restore, the first user interface to an original interface based on determining that the user is not located within the geographic fence.

2. The system of claim 1, wherein the system further comprises:
a plurality of physical electric transmitter devices, wherein each physical electric transmitter device is configured to transmit a wireless proximity signal to a predetermined broadcast area;
wherein executing the computer-readable code is configured to further cause the at least one processing device to:
identify one or more physical electric transmitter devices of the plurality of electric transmitter devices that are associated with the physical event geographic area; and
configure the geographic fence such that, entering the geographic fence would cause the first user to be within a broadcast range of at least one physical electric transmitter device of the one or more physical electric transmitter devices, within a predetermined time period after entering.

3. The system of claim 2, wherein, for each physical electric transmitter device, the wireless proximity signal comprises a encoded unique location code associated with the physical electric transmitter device, wherein executing the computer-readable code is configured to further cause the at least one processing device to:
receive an encoded augmented signal from the user device, wherein the encoded augmented signal is transmitted by the user device is response to the user device receiving the proximity signal of a first physical electric transmitter device, wherein the encoded augmented signal comprises the encoded unique location code of the first physical electric transmitter device and a user device identifier;

decode the augmented signal to determine the unique location code associated with the first physical electric transmitter device;

identify a location of the first physical electric transmitter device based on the unique location code; and determine that the first user is located within the geographic fence based on determining that the location of the first physical electric transmitter device is within the geographic fence.

4. The system of claim 1, wherein executing the computer-readable code is configured to further cause the at least one processing device to:

transmit a non-intrusive location query to the user device, wherein the non-intrusive location query is configured to receive a response, from the user device, affirming or negating the query; and determine that the first user is located within the geographic fence based on receiving an affirmation of the query from the user device.

5. The system of claim 1, wherein the physical flux parameters comprise one or more of user traffic at the resource entity, current user volume of the resource entity, estimated checkout time at the resource entity, user influx and user outflow of the resource entity.

6. The system of claim 1, wherein executing the computer-readable code is configured to further cause the at least one processing device to:

determine, for each resource entity of the first plurality of resource entities, a travel time duration for the user to travel to the resource entity from the user's current location;

determine, for each resource entity of the first plurality of resource entities, an estimated checkout time duration;

determine, for each resource entity of the first plurality of resource entities, an activity time duration comprising a combination of the travel time duration and the checkout time duration for the resource entity; and wherein determining that the at least one resource entity of the first plurality of entities is associated with predetermined flux parameters lower than the predetermined value comprises determining that an activity time duration for the at least one resource entities is below a predetermined value.

7. The system of claim 1, wherein executing the computer-readable code is configured to further cause the at least one processing device to:

identify one or more products associated with the first user; and transmit, via the operative communication channel, control instructions that are configured to cause the user device to route the first user to the at least one resource entity based on determining that the at least one resource entity is associated with the one or more products.

8. The system of claim 1, wherein the application program interface parameters are associated with one or more activity incentives provided by the at least one resource entity system, wherein the one or more activity incentives comprise temporal incentives and collective incentives, wherein executing the computer-readable code is configured to further cause the at least one processing device to:

transmit, via the operative communication channel, control instructions configured to cause, in real time, display of the one or more activity incentives within the first user interface of the user device;

wherein temporal incentives are associated with user activities conducted within a predetermined time period;

wherein collective incentives are associated with user activities conducted by a first number of users within a predetermined time period.

9. A computer program product for integrated geolocation resource transfer, wherein the computer program product is configured to provide optimal user flux distribution within a geographic fence using a centralized integrated geolocation resource transfer platform, the computer program product comprising a non-transitory computer-readable storage medium having computer-executable instructions that when executed by an integrated geolocation resource transfer system cause the geolocation resource transfer system to:

identify, via the integrated geolocation resource transfer system, a first plurality of resource entities located within a geographic fence, wherein the geographic fence is associated with an physical event geographic area containing the first plurality of resource entities;

determine, via the integrated geolocation resource transfer system, in real time, for each resource entity of the first plurality of resource entities, physical flux parameters associated with the resource entity, wherein the physical flux parameters are associated with current user traffic at the resource entity;

identify, via the integrated geolocation resource transfer system, in real time, a first user currently located within the geographic fence;

establish, via a network, an operative communication channel with a user device associated with the first user; and in response to determining, in real time, that (i) at least one resource entity of the first plurality of resource entities is associated with predetermined flux parameters lower than a predetermined value, and (ii) the first user is not currently located within a predetermined distance of the at least one resource entity:

transmit, via the operative communication channel, control instructions that are configured to cause the user device to present a first user interface, wherein the first user interface is configured to route the first user to the at least one resource entity; and facilitate, via the integrated geolocation resource transfer system the at least one resource entity located within the geographic fence to configure, in real time, the first user interface by receiving, from a first resource entity system associated with the at least one resource entity, application program interface parameters, wherein the application program parameters comprise content specific to the at least one resource entity;

transmitting, via the operative communication channel, control instructions configured to cause, in real time, modification of the first user interface based on the application program parameters; and transmitting, via the operative communication channel, control instructions configured to restore, the first user interface to an original interface based on determining that the user is not located within the geographic fence.

10. The computer program product of claim 9, wherein the non-transitory computer-readable storage medium further comprises computer-executable instructions that when executed by the integrated geolocation resource transfer system cause the geolocation resource transfer system to:

identify one or more physical electric transmitter devices associated with the physical event geographic area, wherein each physical electric transmitter device is configured to transmit a wireless proximity signal to a predetermined broadcast area; and configure the geographic fence such that, entering the geographic fence would cause the first user to be within a broadcast range of at least one physical electric transmitter device of the one or more physical electric transmitter devices, within a predetermined time period after entering.

11. The computer program product of claim 10, wherein, for each physical electric transmitter device, the wireless proximity signal comprises a encoded unique location code associated with the physical electric transmitter device, wherein the non-transitory computer-readable storage medium further comprises computer-executable instructions that when executed by the integrated geolocation resource transfer system cause the geolocation resource transfer system to:

receive an encoded augmented signal from the user device, wherein the encoded augmented signal is transmitted by the user device is response to the user device receiving the proximity signal of a first physical electric transmitter device, wherein the encoded augmented signal comprises the encoded unique location code of the first physical electric transmitter device and a user device identifier;

decode the augmented signal to determine the unique location code associated with the first physical electric transmitter device;

identify a location of the first physical electric transmitter device based on the unique location code; and determine that the first user is located within the geographic fence based on determining that the location of the first physical electric transmitter device is within the geographic fence.

12. The computer program product of claim 9, wherein the non-transitory computer-readable storage medium further comprises computer-executable instructions that when executed by the integrated geolocation resource transfer system cause the geolocation resource transfer system to:

transmit a non-intrusive location query to the user device, wherein the non-intrusive location query is configured to receive a response, from the user device, affirming or negating the query; and determine that the first user is located within the geographic fence based on receiving an affirmation of the query from the user device.

13. The computer program product of claim 9, wherein the physical flux parameters comprise one or more of user traffic at the resource entity, current user volume of the resource entity, estimated checkout time at the resource entity, user influx and user outflow of the resource entity.

14. The computer program product of claim 9, wherein the non-transitory computer-readable storage medium further comprises computer-executable instructions that when executed by the integrated geolocation resource transfer system cause the geolocation resource transfer system to:

determine, for each resource entity of the first plurality of resource entities, a travel time duration for the user to travel to the resource entity from the user's current location;

determine, for each resource entity of the first plurality of resource entities, an estimated checkout time duration;

determine, for each resource entity of the first plurality of resource entities, an activity time duration comprising a combination of the travel time duration and the checkout time duration for the resource entity; and wherein determining that the at least one resource entity of the first plurality of entities is associated with predetermined flux parameters lower than the predetermined value comprises determining that an activity time duration for the at least one resource entities is below a predetermined value.

15. The computer program product of claim 9, wherein the non-transitory computer-readable storage medium further comprises computer-executable instructions that when executed by the integrated geolocation resource transfer system cause the geolocation resource transfer system to:

identify one or more products associated with the first user; and transmit, via the operative communication channel, control instructions that are configured to cause the user device to route the first user to the at least one resource entity based on determining that the at least one resource entity is associated with the one or more products.

16. The computer program product of claim 9, wherein the application program interface parameters are associated with one or more activity incentives provided by the at least one resource entity system, wherein the one or more activity incentives comprise temporal incentives and collective incentives, wherein the non-transitory computer-readable storage medium further comprises computer-executable instructions that when executed by the integrated geolocation resource transfer system cause the geolocation resource transfer system to:

transmit, via the operative communication channel, control instructions configured to cause, in real time, display of the one or more activity incentives within the first user interface of the user device;

wherein temporal incentives are associated with user activities conducted within a predetermined time period;

wherein collective incentives are associated with user activities conducted by a first number of users within a predetermined time period.

17. A computer implemented method for integrated geolocation resource transfer, wherein the computer implemented method is configured to provide optimal user flux distribution within a geographic fence using a centralized integrated geolocation resource transfer platform, the computer implemented method comprising:

identifying, via an integrated geolocation resource transfer system, a first plurality of resource entities located within a geographic fence, wherein the geographic fence is associated with an physical event geographic area containing the first plurality of resource entities;

determining, via the integrated geolocation resource transfer system, in real time, for each resource entity of the first plurality of resource entities, physical flux parameters associated with the resource entity, wherein the physical flux parameters are associated with current user traffic at the resource entity;

identifying, via the integrated geolocation resource transfer system, in real time, a first user currently located within the geographic fence;

establishing, via a network, an operative communication channel with a user device associated with the first user; and in response to determining, in real time, that (i) at least one resource entity of the first plurality of resource entities is associated with predetermined flux parameters lower than a predetermined value, and (ii) the first user is not currently located within a predetermined distance of the at least one resource entity:

transmitting, via the operative communication channel, control instructions that are configured to cause the user device to present a first user interface, wherein the first user interface is configured to route the first user to the at least one resource entity; and facilitating, via the integrated geolocation resource transfer system, the at least one resource entity located within the geographic fence to configure, in real time, the first user interface by receiving, from a first resource entity system associated with the at least one resource entity, application program interface parameters, wherein the application program parameters comprise content specific to the at least one resource entity;

transmitting, via the operative communication channel, control instructions configured to cause, in real time, modification of the first user interface based on the application program parameters; and transmitting, via the operative communication channel, control instructions configured to restore, the first user interface to an original interface based on determining that the user is not located within the geographic fence.

18. The computer implemented method of claim 17, wherein the physical flux parameters comprise one or more of user traffic at the resource entity, current user volume of the resource entity, estimated checkout time at the resource entity, user influx and user outflow of the resource entity, wherein the computer implemented method further comprises:

determining, for each resource entity of the first plurality of resource entities, a travel time duration for the user to travel to the resource entity from the user's current location;

determining, for each resource entity of the first plurality of resource entities, an estimated checkout time duration;

determining, for each resource entity of the first plurality of resource entities, an activity time duration comprising a combination of the travel time duration and the checkout time duration for the resource entity; and wherein determining that the at least one resource entity of the first plurality of entities is associated with predetermined flux parameters lower than the predetermined value comprises determining that an activity time duration for the at least one resource entities is below a predetermined value.

19. The computer implemented method of claim 17, further comprising:

providing a plurality of physical electric transmitter devices, wherein each physical electric transmitter device is configured to transmit a wireless proximity signal to a predetermined broadcast area;

identifying one or more physical electric transmitter devices of the plurality of electric transmitter devices that are associated with the physical event geographic area; and configuring the geographic fence such that, entering the geographic fence would cause the first user to be within a broadcast range of at least one physical electric transmitter device of the one or more physical electric transmitter devices, within a predetermined time period after entering.

20. The computer implemented method of claim 17, wherein the application program interface parameters are associated with one or more activity incentives provided by the at least one resource entity system, wherein the one or more activity incentives comprise temporal incentives and collective incentives, wherein the computer implemented method further comprises:

transmitting, via the operative communication channel, control instructions configured to cause, in real time, display of the one or more activity incentives within the first user interface of the user device;

wherein temporal incentives are associated with user activities conducted within a predetermined time period;

wherein collective incentives are associated with user activities conducted by a first number of users within a predetermined time period.

\* \* \* \* \*